United States Patent
Nakamura et al.

(10) Patent No.: US 6,489,396 B2
(45) Date of Patent: Dec. 3, 2002

(54) (METH)ACRYLATE ESTER-BASED RESIN COMPOSITION

(75) Inventors: Kazuhiko Nakamura, Kawanishi (JP); Yoshiyuki Yokota, Suita (JP); Kunio Takahashi, Takatsuki (JP); Masaya Yoshida, Himeji (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 09/938,652

(22) Filed: Aug. 27, 2001

(65) Prior Publication Data

US 2002/0091197 A1 Jul. 11, 2002

(30) Foreign Application Priority Data

Nov. 13, 2000 (JP) ........................................ 2000-345966

(51) Int. Cl.$^7$ ........................ C08L 33/14; C09D 133/14
(52) U.S. Cl. ...................... 525/117; 525/107; 525/118; 525/119; 525/123; 525/124; 525/131; 525/162; 525/163; 525/175; 525/176; 525/216; 525/326.7; 525/328.2; 525/327.3; 525/327.7; 525/329.7; 525/329.9; 525/330.3; 525/330.5; 525/330.6; 525/934; 526/309
(58) Field of Search ................................ 525/107, 117, 525/118, 119, 123, 124, 162, 163, 176, 216, 330.3, 330.5, 330.6, 131, 175, 326.1, 328.2, 327.3, 329.7, 329.9, 934; 526/309

(56) References Cited

U.S. PATENT DOCUMENTS 5,239,028 A    8/1993  Nakagawa et al. ......... 526/265
5,759,631 A *  6/1998  Rink ........................ 427/407.1

FOREIGN PATENT DOCUMENTS

| FR | 1119407 | 6/1956 |
| GB | 2253208 | 9/1992 |
| JP | 124934 | 10/1975 |
| JP | 3128978 | 5/1991 |
| JP | 136324 | 5/2000 |
| JP | 019721 | 1/2001 |

* cited by examiner

Primary Examiner—Patricia A. Short
(74) Attorney, Agent, or Firm—Roylance, Abrams, Berdo & Goodman, L.L.P.

(57) ABSTRACT

The present invention provides a novel (meth)acrylate ester-based resin composition which, for example, exhibits various good properties such as weather resistance, heat resistance, water resistance, acid resistance, alkali resistance, warm water resistance, impact resistance, processability, flexibility, hardness, elongation, transparency, luster, fleshy property, mirroring property, pigment dispersibility, and driability when being used, for example, as crosslinking type paints, adhesives, pressure sensitive adhesives, and fiber-processing materials, and has so low a resin viscosity as to be utilizable as a resin for coping with environmental pollution of such as low-VOC paints. The (meth)acrylate ester-based resin composition comprises a (meth)acrylate ester-based polymer (I) and a crosslinking agent, wherein the (meth)acrylate ester-based polymer is obtained by a process including the step of polymerizing a monomer component including a polymerizable unsaturated monomer (a) as an essential component and has a reactive group wherein the polymerizable unsaturated monomer (a) is an alkylcyclohexylalkyl ester of (meth)acrylic acid, and wherein the crosslinking agent has at least two functional groups that are reactable with the reactive group.

7 Claims, No Drawings

(METH)ACRYLATE ESTER-BASED RESIN COMPOSITION

BACKGROUND OF THE INVENTION

A. Technical Field

The present invention relates to a novel (meth)acrylate ester-based resin composition.

In more detail, the present invention relates to a novel (meth)acrylate ester-based resin composition which, for example, exhibits various good properties such as weather resistance, heat resistance, water resistance, acid resistance, alkali resistance, warm water resistance, impact resistance, processability, flexibility, hardness, elongation, transparency, luster, fleshy property, mirroring property, pigment dispersibility, and driability when being used for various uses such as coating agents (e.g. for films, plastics, glass, paper, fibers, leather), pressure sensitive adhesives, and adhesives in addition to various paints (e.g. lacquer type paints, curing type paints) such as paints for building exteriors, paints for building materials, paints for metals, paints for steel-made furniture, paints for plastics, heavy anticorrosive paints, waterproof paints for roofs, paints for cars, paints for car parts, and paints for electrical appliances.

B. Background Art (Meth)acrylic resin paints which contain crosslinking agents are superior to noncrosslinking type acrylic resin paints in respect to such as weather resistance, heat resistance, water resistance, alkali resistance, warm water resistance, impact resistance, processability, and flexibility, and are therefore used in wide fields of such as building materials, woodworking, roofing tiles, metals, paper, plastics, glass, and fibers, and desired to be still more excellent in respect to the above properties.

Coating films of paints which are used in such as architectural fields and building fields have so far had problems of undergoing such as hazing, discoloring, blistering, or cracking due to such as ultraviolet rays, heat, alkali components as eluted from substrates, and recent acid rain because of being exposed to wind, rain, or sunlight for a long time. Therefore, in the case where durability and weather resistance for a long time are needed, it is effective to use such as solvent type fluororesin paints or acrylic silicone resin paints. However, there are problems in that these paints increase costs so much as to be usable actually for limited uses only.

In addition, cyclohexyl (meth)acrylate was particularly favorable as a polymerizable unsaturated monomer having the low hygroscopic functional group effective for achieving the high weather resistance. However, in the case where the cyclohexyl (meth)acrylate content of polymers is too high, the resultant coating films are inferior in such as flexibility, processability, and adhesion. Therefore, there are problems in that the current level is still insufficient, so the range of the actual use of the cyclohexyl (meth)acrylate is also limited.

SUMMARY OF THE INVENTION

A. Object of the Invention

An object of the present invention is to provide a novel (meth)acrylate ester-based resin composition which, for example, exhibits various good properties such as weather resistance, heat resistance, water resistance, acid resistance, alkali resistance, warm water resistance, impact resistance, processability, flexibility, hardness, elongation, transparency, luster, fleshy property, mirroring property, pigment dispersibility, and driability when being used, for example, as crosslinking type paints, adhesives, pressure sensitive adhesives, and fiber-processing materials, and has so low a resin viscosity as to be utilizable as a resin for coping with environmental pollution of such as low-VOC paints.

B. Disclosure of the Invention

The present inventors diligently studied to solve the above problems. As a result, they have completed the present invention by finding out that the above problems could be solved by a (meth)acrylate ester-based resin composition comprising a (meth)acrylate ester-based polymer and a crosslinking agent wherein the (meth)acrylate ester-based polymer is obtained by a process including the step of polymerizing a monomer component including a specific (meth)acrylate ester as an essential component wherein the (meth)acrylate ester possesses an alkylcyclohexylalkyl group as an introduced ester group.

That is to say, a (meth)acrylate ester-based resin composition, according to the present invention, comprises a (meth)acrylate ester-based polymer (I) and a crosslinking agent, wherein the (meth)acrylate ester-based polymer is obtained by a process including the step of polymerizing a monomer component including a polymerizable unsaturated monomer (a) as an essential component and has a reactive group wherein the polymerizable unsaturated monomer (a) is an alkylcyclohexylalkyl ester of (meth)acrylic acid, and wherein the crosslinking agent has at least two functional groups that are reactable with the reactive group. More specifically, the alkylcyclohexylalkyl ester of (meth)acrylic acid, as referred to in the present invention, has an alkyl group on the cyclohexyl group.

These and other objects and the advantages of the present invention will be more fully apparent from the following detailed disclosure.

DETAILED DESCRIPTION OF THE INVENTION ((Meth)acrylate Ester-based Polymer)

The (meth)acrylate ester-based polymer (I), which is an essential component of the (meth)acrylate ester-based resin composition according to the present invention, is a polymer which is obtained by a process including the step of polymerizing a monomer component including a polymerizable unsaturated monomer (a) as an essential component wherein the polymerizable unsaturated monomer (a) is an alkylcyclohexylalkyl ester of (meth)acrylic acid, and which has a reactive group. Incidentally, the cyclohexyl group in the molecular structure of the aforementioned polymerizable unsaturated monomer (a) has a substituent.

In addition, the aforementioned alkylcyclohexylalkyl ester of (meth)acrylic acid, which is an essential monomer component of the (meth)acrylate ester-based polymer (I) that is an essential component of the resin composition according to the present invention, is favorably denoted by the following general formula (1):

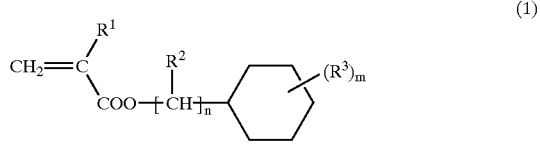

(1)

$R^1$ in the specific polymerizable unsaturated monomer (a) as denoted by the aforementioned general formula (1) is a hydrogen atom or methyl group.

$R^2$ in the specific polymerizable unsaturated monomer (a) as denoted by the aforementioned general formula (1)

is a hydrogen atom or organic residue. In the case where the $R^2$ is an organic residue, favorable examples include 1-cyclohexylethyl (meth)acrylate (which might be referred to as cyclohexyl(methyl)methyl (meth)acrylate) although there is no especial limitation thereto. In addition, n is an integer of 1 to 4.

$R^3$ in the specific polymerizable unsaturated monomer (a) as denoted by the aforementioned general formula (1) is an organic residue on the cyclohexyl group. In addition, m is an integer of 1 or 2. The case of m=1 denotes monosubstitution, and the case of m=2 denotes disubstitution. In this case, $R^3$ may be a substituent at any position if it is on the cyclohexyl group. In addition, one kind of substituent may exist in one or more places, or at least two kinds of substituents may exist in one or more places. Examples of $R^3$, which is an organic residue, include linear, branched, or cyclic alkyl groups having 1 to 10 carbon atoms, hydroxyalkyl groups having 1 to 5 carbon atoms, alkoxyalkyl groups having 1 to 5 carbon atoms, acetoxyalkyl groups having 1 to 5 carbon atoms, and halogenated (e.g. chlorinated, brominated, or fluorinated) alkyl groups having 1 to 5 carbon atoms. Favorably used of them are alkyl groups having 1 to 4 carbon atoms, hydroxyalkyl groups having 1 to 2 carbon atoms, alkoxyalkyl groups having 1 to 2 carbon atoms, and acetoxyalkyl groups having 1 to 2 carbon atoms. As is mentioned above, the above $R^3$ may be a substituent at any position if it is on the cyclohexyl group, but favorably the position of $R^3$ is the 3- or 4-numbered position. However, the above $R^3$ is defined as not including the epoxy-substituent structure which is seen in such as 3,4-epoxycyclohexylmethyl (meth)acrylate and 3,4-epoxycyclohexylethyl (meth)acrylate. In other words, the alicyclic epoxy ring structure is not included in the cyclohexyl group structure in the aforementioned general formula (1).

Although not especially limited, favorable specific examples of the specific polymerizable unsaturated monomer (a) as denoted by the aforementioned general formula (1) include 4-methylcyclohexylmethyl (meth)acrylate, 4-ethylcyclohexylmethyl (meth)acrylate, 4-propylcyclohexylmethyl (meth)acrylate, 4-butylcyclohexylmethyl (meth)acrylate, 4-methoxycyclohexylmethyl (meth)acrylate, 4-acetoxymethylcyclohexylmethyl (meth)acrylate, 3-methylcyclohexylmethyl (meth)acrylate, 3-ethylcyclohexylmethyl (meth)acrylate, 3-propylcyclohexylmethyl (meth)acrylate, 3-butylcyclohexylmethyl (meth)acrylate, 3-methoxycyclohexylmethyl (meth)acrylate, 3-acetoxymethylcyclohexylmethyl (meth)acrylate, 3-hydroxymethylcyclohexylmethyl (meth)acrylate, 4-methylcyclohexylethyl (meth)acrylate, 4-ethylcyclohexylethyl (meth)acrylate, 4-propylcyclohexylethyl (meth)acrylate, 4-butylcyclohexylethyl (meth)acrylate, 4-methoxycyclohexylethyl (meth)acrylate, 4-acetoxymethylcyclohexylethyl (meth)acrylate, 4-hydroxymethylcyclohexylethyl (meth)acrylate, 3-methylcyclohexylethyl (meth)acrylate, 3-ethylcyclohexylethyl (meth)acrylate, 3-propylcyclohexylethyl (meth)acrylate, 3-butylcyclohexylethyl (meth)acrylate, 3-methoxycyclohexylethyl (meth)acrylate, 3-acetoxymethylcyclohexylethyl (meth)acrylate, 3-hydroxymethylcyclohexylethyl (meth)acrylate, 4-methylcyclohexylpropyl (meth)acrylate, 4-ethylcyclohexylpropyl (meth)acrylate, 4-methoxycyclohexylpropyl (meth)acrylate, 4-acetoxymethylcyclohexylpropyl (meth)acrylate, 4-hydroxymethylcyclohexylpropyl (meth)acrylate, 3-methylcyclohexylpropyl (meth)acrylate, 3-ethylcyclohexylpropyl (meth)acrylate, 3-methoxycyclohexylpropyl (meth)acrylate, 3-acetoxymethylcyclohexylpropyl (meth)acrylate, 3-hydroxymethylcyclohexylpropyl (meth)acrylate, 4-methylcyclohexylbutyl (meth)acrylate, 4-ethylcyclohexylbutyl (meth)acrylate, 4-methoxycyclohexylbutyl (meth)acrylate, 4-acetoxymethylcyclohexylbutyl (meth)acrylate, 4-hydroxymethylcyclohexylbutyl (meth)acrylate, 3-methylcyclohexylbutyl (meth)acrylate, 3-ethylcyclohexylbutyl (meth)acrylate, 3-methoxycyclohexylbutyl (meth)acrylate, 3-acetoxymethylcyclohexylbutyl (meth)acrylate, 3-hydroxymethylcyclohexylbutyl (meth)acrylate, 2-methyl-1-cyclohexylmethyl (meth)acrylate, 2,3-dimethyl-1-cyclohexylmethyl (meth)acrylate, 2,4-dimethyl-1-cyclohexylmethyl (meth)acrylate, 2,6-dimethyl-1-cyclohexylmethyl (meth)acrylate, 2-phenyl-1-cyclohexylmethyl (meth)acrylate, 2-phenyl-3-methyl-1-cyclohexylmethyl (meth)acrylate, 2-phenyl-4-methyl-1-cyclohexylmethyl (meth)acrylate, 2-phenyl-5-methyl-1-cyclohexylmethyl (meth) acrylate, and 2-phenyl-6-methyl-1-cyclohexylmethyl (meth)acrylate. Of these, those which include isomers may be each isomer alone and/or mixtures of isomers. Favorably used of the above polymerizable unsaturated monomers (a) are 4-methylcyclohexylmethyl (meth)acrylate, 4-ethylcyclohexylmethyl (meth)acrylate, 4-methoxycyclohexylmethyl (meth)acrylate, 4-acetoxymethylcyclohexylmethyl (meth)acrylate, 3-methylcyclohexylmethyl (meth)acrylate, 3-ethylcyclohexylmethyl (meth)acrylate, 3-acetoxymethylcyclohexylmethyl (meth)acrylate, 3-hydroxymethylcyclohexylmethyl (meth)acrylate, 4-methylcyclohexylethyl (meth)acrylate, 3-methylcyclohexylethyl (meth)acrylate, 4-methylcyclohexylpropyl (meth)acrylate, 3-methylcyclohexylpropyl (meth)acrylate, 4-methylcyclohexylbutyl (meth)acrylate, and 3-methylcyclohexylbutyl (meth)acrylate.

The (meth)acrylate ester-based polymer (I), which is an essential component of the resin composition according to the present invention, is obtained by a process including the step of polymerizing a monomer component including the above specific polymerizable unsaturated monomer (a) of the aforementioned general formula (1) as an essential component. The content of the polymerizable unsaturated monomer (a) in the aforementioned monomer component is favorably not less than 5 weight %, more favorably not less than 10 weight %, still more favorably not less than 20 weight %, yet still more favorably not less than 25 weight %, particularly favorably not less than 30 weight %, most favorably not less than 35 weight %, in view of the properties of the resulting aforementioned (meth)acrylate ester-based polymer and further the properties of the finally obtained resin composition according to the present invention. In addition, the content of the polymerizable unsaturated monomer (a) in the aforementioned monomer component is favorably not more than 95 weight %, more favorably not more than 90 weight %, still more favorably not more than 85 weight %, for enhancing the weather resistance and getting better such as property balance between impact resistance and flexibility, as concerned with processability, of the finally obtained resin composition according to the present invention.

Favorable examples of the process for producing the specific polymerizable unsaturated monomer (a) of the aforementioned general formula (1) include: ① a production process comprising the step of carrying out a reaction between (meth)acrylic acid and an alcohol as denoted by the below-mentioned general formula (2); ② a production process comprising the step of carrying out a reaction between a (meth)acryloyl halide and an alcohol as denoted by the below-mentioned general formula (2); ③ a production process comprising the step of carrying out a reaction between (meth)acrylic anhydride and an alcohol as denoted by the below-mentioned general formula (2); ④ a production process comprising the step of carrying out a reaction between a (meth)acrylic acid alkyl ester and an alcohol as denoted by the below-mentioned general formula (2); and ⑤ a production process comprising the step of carrying out a reaction between (meth)acrylic acid and a carboxylate ester as denoted by the below-mentioned general formula (3). However, there is no especial limitation to these production processes. Of these production processes, particularly, production processes ①, ④, and ⑤ are favorable for such as economy.

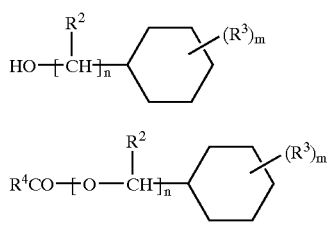

wherein:
$R^2$ is a hydrogen atom or organic residue;
$R^3$ is an organic residue on the cyclohexyl group;
$R^4$ is a hydrogen atom or organic residue;
m is an integer of 1 or 2; and
n is an integer of 1 to 4. However, the above $R^3$ is defined as not including the epoxy substituent which is seen in such as 3,4-epoxycyclohexylmethyl (meth)acrylate and 3,4-epoxycyclohexylethyl (meth)acrylate.

As is mentioned above, the (meth)acrylate ester-based polymer (I) in the present invention comprises the monomer component including the above polymerizable unsaturated monomer (a) as an essential component wherein the polymerizable unsaturated monomer (a) is an alkylcyclohexylalkyl ester of (meth)acrylic acid particularly of the cyclohexylalkyl esters of (meth)acrylic acid. Therefore, not only this polymer (I) but also the below-mentioned (meth)acrylate ester-based resin composition, comprising this polymer (I) as an essential component, exhibits the enhanced properties, which are not especially limited, but can favorably be exemplified by the following 1) to 3). 1) In the case where the polymer (composition) is used as a resin (composition) for paints, the processability and the toughness such as impact resistance of the coating film are enhanced. 2) The increase of the solubility into a solvent provides enablement for easy achievement of the decrease of the resin viscosity and the increase of the resin solid content, particularly, provides enablement for utilization for such as a resin (composition) for high-solid paints as a resin (composition) for paints of types coping with the environment and a resin (composition) for weak solvent type paints involving the use of low polar solvents. 3) In the case where the polymer (composition) is used as a resin (composition) for paints, such as water resistance and weather resistance of the coating film are enhanced, and further, the properties which are demanded to clear top paints for cars such as resistance to acid rain are enhanced.

The (meth)acrylate ester-based polymer (I) in the present invention favorably has a reactive group. When this (meth)acrylate ester-based polymer (I) is produced, the process for introducing the above reactive group is not especially limited, but favorable examples thereof include: (1) a process involving the use of the polymerizable unsaturated monomer (a) and a polymerizable unsaturated monomer (b) which is another polymerizable unsaturated monomer copolymerizable with the monomer (a) and has a reactive group; and (2) a process comprising the steps of polymerizing the monomer component including the polymerizable unsaturated monomer (a) as an essential component, and then carrying out such as an addition reaction of a compound having a reactive group, thereby introducing the reactive group. Either one of these processes or a plurality thereof may be used. In addition, in the case where the reactive group to be introduced is such as a hydroxyl group, an acidic functional group (e.g. a carboxyl group, a sulfonic acid group, a phosphoric acid group), an epoxy group, a hydrolyzable silyl group, a silanol group, an active carbonyl group, an oxazoline group, or an isocyanate group, it is effective to use the process (1) above.

In the case where the process (1) above is used as the process for preparing the (meth)acrylate ester-based polymer (I) in the present invention, it is favorable to polymerize monomer components including the polymerizable unsaturated monomer (a) and the polymerizable unsaturated monomer (b) having a reactive group as essential components in order that the (meth)acrylate ester-based polymer (I) can have the reactive group. Specifically, in the case where the (meth)acrylate ester-based polymer (I) in the present invention is obtained, it is favorable to copolymerize the polymerizable unsaturated monomer (a) and the polymerizable unsaturated monomer (b) having a reactive group or to copolymerize the polymerizable unsaturated monomer (a), the polymerizable unsaturated monomer (b) having a reactive group, and another polymerizable unsaturated monomer (c) which is copolymerizable with at least one of these monomers.

The above polymerizable unsaturated monomer (b) having a reactive group is not especially limited, but favorable examples thereof include: (i) polymerizable unsaturated monomers having the alcoholic hydroxyl group; (ii) polymerizable unsaturated monomers having the acidic functional group; (iii) polymerizable unsaturated monomers having the epoxy group; (iv) polymerizable unsaturated monomers having the isocyanate group; (v) polymerizable unsaturated monomers having the active carbonyl group; and (vi) polymerizable unsaturated monomers having the oxazoline group. These may be used either alone respectively or in combinations with each other. In addition, specific examples of each of these monomers (i) to (vi) are hereinafter enumerated, but there is no especial limitation thereto.

Favorable examples of the (i) polymerizable unsaturated monomers having the alcoholic hydroxyl group include hydroxyl-group-containing (meth)acrylates such as 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, methyl(α- hydroxymethyl) acrylate, ethyl(α-hydroxymethyl) acrylate, butyl(α-hydroxymethyl) acrylate, caprolactone-modified hydroxy(meth)acrylate (trade name: Placcel F series, produced by Daicel Chemical Industries, Ltd.), 4-hydroxymethylcyclohexylmethyl (meth)acrylate, ethylene glycol mono(meth)acrylate, diethylene glycol mono(meth)acrylate, tetraethylene glycol mono(meth)acrylate, propylene glycol mono(meth)acrylate, dipropylene glycol mono (meth)acrylate, and tetrapropylene glycol mono(meth) acrylate. These may be used either alone respectively or in combinations with each other.

Favorable examples of the (ii) polymerizable unsaturated monomers having the acidic functional group include:
  carboxyl-group-containing unsaturated monomers such as acrylic acid, methacrylic acid, maleic acid, fumaric acid, crotonic acid, itaconic acid, citraconic acid, maleic anhydride, monomethyl maleate, monobutyl maleate, monomethyl itaconate, monobutyl itaconate, vinylbenzoic acid, monohydroxyethyl oxalate (meth) acrylate, dimethyl maleate, diethyl maleate, dibutyl maleate, dimethyl fumarate, diethyl fumarate, dibutyl fumarate, carboxyl-group-terminated caprolactone-modified acrylate (trade name: Placcel FA series, produced by Daicel Chemical Industries, Ltd.), and carboxyl-group-terminated caprolactone-modified methacrylate (trade name: Placcel FMA series, produced by Daicel Chemical Industries, Ltd.);
  metal salts and amine salts of the carboxyl-group-containing unsaturated monomers, such as sodium acrylate and sodium methacrylate;
  sulfonic-acid-group-containing unsaturated monomers such as vinylsulfonic acid, styrenesulfonic acid, and sulfoethyl (meth)acrylate; and
  acidic-functional-group-containing polymerizable unsaturated monomers, for example, acidic phosphate ester-based unsaturated monomers such as 2-(meth)acryloyloxyethyl acid phosphate, 2-(meth)acryloyloxypropyl acid phosphate, 2-(meth)acryloyloxy-3-chloro-propyl acid phosphate, and 2-(meth)acryloyloxyethyl phenyl phosphate.

These may be used either alone respectively or in combinations with each other.

Favorable examples of the (iii) polymerizable unsaturated monomers having the epoxy group include glycidyl (meth)acrylate, α-methylglycidyl acrylate, glycidyl allyl ether, oxocyclohexylmethyl (meth)acrylate, 3,4-epoxycyclohexylmethyl acrylate (trade name: CYCLOMER A200, produced by Daicel Chemical Industries, Ltd.), α-methylglycidyl methacrylate (trade name: M-GMA, produced by Daicel Chemical Industries, Ltd.), and 3,4-epoxycyclohexylmethyl methacrylate (trade name: CYCLOMER M100, produced by Daicel Chemical Industries, Ltd.). These may be used either alone respectively or in combinations with each other.

Favorable examples of the (iv) polymerizable unsaturated monomers having the isocyanate group include 2-methacryloyloxyethyl isocyanate (trade name: Karenz MOI, produced by SHOWA DENKO Corporation), methacryloyl isocyanate (trade name: MAI, produced by Nippon Paint Co., Ltd.), and m-isopropenyl-α,α-dimethylbenzyl isocyanate (trade name: m-TMI, produced by Takeda Chemical Industries, Ltd.). These may be used either alone respectively or in combinations with each other.

Favorable examples of the (v) polymerizable unsaturated monomers having the active carbonyl group include acrolein, diacetone(meth)acrylamide, acetoacetoxyethyl (meth)acrylate, formylstyrol, vinyl alkyl ketones having 4 to 7 carbon atoms (e.g. vinyl methyl ketone, vinyl ethyl ketone, vinyl butyl ketone), (meth)acryloxyalkylpropenal, diacetone (meth)acrylate, and acetonyl (meth)acrylate. These may be used either alone respectively or in combinations with each other.

Favorable examples of the (vi) polymerizable unsaturated monomers having the oxazoline group include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-methyl-2-oxazoline, and 2-isopropenyl-5-ethyl-2-oxazoline. These may be used either alone respectively or in combinations with each other.

The aforementioned other polymerizable unsaturated monomer (c), which is copolymerizable with the polymerizable unsaturated monomer (a) and/or the polymerizable unsaturated monomer (b) having a reactive group and is used if necessary, is not especially limited, but favorable specific examples thereof include the following:
(meth)acrylic acid alkyl esters such as methyl (meth)acrylate, ethyl (meth)acrylate, n-butyl (meth)acrylate, isobutyl (meth)acrylate, tert-butyl (meth)acrylate, sec-butyl (meth)acrylate, n-propyl (meth)acrylate, isopropyl (meth)acrylate, isoamyl (meth)acrylate, 2-ethylhexyl (meth)acrylate, isodecyl (meth)acrylate, tridecyl (meth)acrylate, cyclohexyl (meth)acrylate, n-octyl (meth)acrylate, isooctyl (meth)acrylate, n-lauryl (meth)acrylate, benzyl (meth)acrylate, dicyclopentanyl (meth)acrylate, n-stearyl (meth)acrylate, isostearyl (meth)acrylate, isobornyl (meth)acrylate, tetrahydrofurfuryl (meth)acrylate, allyl (meth)acrylate, 2-(acetoacetoxy)ethyl (meth)acrylate, and phenoxyethyl (meth)acrylate;
styrenic monomers such as styrene, α-methylstyrene, o-methylstyrene, m-methylstyrene, p-methylstyrene, p-ethylstyrene, 2,4-dimethylstyrene, p-n-butylstyrene, p-t-butylstyrene, p-n-hexylstyrene, p-n-octylstyrene, p-n-nonylstyrene, p-n-dodecylstyrene, and p-phenylstyrene;
vinyl compounds such as vinyltoluene and divinylbenzene;
vinyl esters such as vinyl acetate, vinyl propionate, vinyl chloride, vinylidene chloride, vinyl n-butyrate, vinyl benzoate, vinyl p-t-butylbenzoate, vinyl pivalate, vinyl 2-ethylhexanoate, and vinyl laurate;
(poly)alkylene glycol (meth)acrylates such as methoxydiethylene glycol (meth)acrylate, methoxytetraethylene glycol (meth)acrylate, methoxydipropylene glycol (meth)acrylate, and methoxytetrapropylene glycol (meth)acrylate;
fluorine-containing polymerizable unsaturated monomers such as trifluoroethyl (meth)acrylate, tetrafluoropropyl (meth)acrylate, octafluoropentyl (meth)acrylate, heptadodecafluorodecyl acrylate, β-(perfluorooctyl)ethyl (meth)acrylate, hexafluoropropyl methacrylate, and perfluorooctylethyl (meth)acrylate;
silicon-containing polymerizable unsaturated monomers such as vinyltrichlorosilane, vinyltris(β-methoxyethoxy) silane, vinyltriethoxysilane, vinyltrimethoxysilane, γ-methacryloxypropyltrimethoxysilane, and trimethylsiloxyethyl methacrylate;
nitrogen-atom-containing polymerizable unsaturated monomers such as (meth)acrylamide, N,N-dimethylaminopropylacrylamide, N-isopropylacrylamide, t-butylacrylamide, methylenebis (meth)acrylamide, N-methoxymethylacrylamide, N-ethoxymethylacrylamide, N-butoxymethylacrylamide, N-methylol(meth)acrylamide, N,N'-dimethylaminoethyl (meth)acrylate, N,N'-diethylaminoethyl (meth)acrylate, N-methyl-N-vinylformamide, dimethylaminoethyl methacrylate sulfate salts, N-vinylpyridine, N-vinylimidazole, N-vinylpyrrol, N-vinylpyrrolidone, diacetoneacrylamide, N-phenylmaleimide, N-cyclohexylmaleimide, and (meth)acrylonitrile;

multifunctional polymerizable unsaturated monomers such as (poly)ethylene glycol di(meth)acrylate, (poly)propylene glycol di(meth)acrylate, (poly)butylene glycol di(meth)acrylate, EO-modified trimethylolpropane triacrylate, trimethylolpropane triacrylate, pentaerythritol tetraacrylate, and dipentaerythritol hexaacrylate;

vinyl ethers such as vinyl methyl ether, vinyl ethyl ether, vinyl isopropyl ether, vinyl n-propyl ether, vinyl isobutyl ether, vinyl n-butyl ether, vinyl n-amyl ether, vinyl isoamyl ether, vinyl 2-ethylhexyl ether, vinyl n-octadecyl ether, cyanomethyl vinyl ether, 2,2-dimethylaminoethyl vinyl ether, 2-chloroethyl vinyl ether, β-difluoromethyl vinyl ether, benzyl vinyl ether, phenyl vinyl ether, and divinyl ether;

allyl esters such as allyl acetate and allyl benzoate;

allyl ethers such as allyl ethyl ether, allyl glycidyl ether, and allyl phenylether;

ultraviolet-absorbent polymerizable unsaturated monomers such as 2-[2'-hydroxy-5'-(meth)acryloyloxyethylphenyl]-2H-benzotriazole, 2-[2'-hydroxy-5'-(meth)acryloyloxypropylphenyl]-2H-benzotriazole, 2-[2'-hydroxy-5'-(meth)acryloyloxyhexylphenyl]-2H-benzotriazole, 2-[2'-hydroxy-3'-tert-butyl-5'-(meth)acryloyloxyethylphenyl]-2H-benzotriazole, 2-[2'-hydroxy-3'-tert-butyl-5'-(meth)acryloyloxyethylphenyl]-5-chloro-2H-benzotriazole, 2-[2'-hydroxy-5'-tert-butyl-3'-(meth)acryloyloxyethylphenyl]-2H-benzotriazole, 2-[2'-hydroxy-5'-(meth)acryloyloxyethylphenyl]-5-chloro-2H-benzotriazole, 2-[2'-hydroxy-5'-(meth)acryloyloxyethylphenyl]-5-methoxy-2H-benzotriazole, 2-[2'-hydroxy-5'-(meth)acryloyloxyethylphenyl]-5-cycno-2H-benzotriazole, 2-[2'-hydroxy-5'-(meth)acryloyloxyethylphenyl]-5-t-butyl-2H-benzotriazole, 2-[2'-hydroxy-5'-(β-methacryloyloxyethoxy)-3'-tert-butylphenyl]-4-tert-butyl-2H-benzotriazole, 2-hydroxy-4-methacryloxybenzophenone, 2-hydroxy-4-(2-hydroxy-3-methacryloyloxy)propoxybenzophenone, 2-hydroxy-4-(2-methacryloxy)ethoxybenzophenone, and 2-hydroxy-4-vinyloxycarbonylmethoxybenzophenone; and ultraviolet-stable polymerizable unsaturated monomers such as 4-(meth)acryloyloxy-2,2,6,6-tetramethylpiperidine, 4-(meth)acryloyloxy-1,2,2,6,6-pentamethylpiperidine, 4-(meth)acryloylamino-2,2,6,6-tetramethylpiperidine, 4-(meth)acryloylamino-1,2,2,6,6-pentamethylpiperidine, 4-cyano-4-(meth)acryloylamino-2,2,6,6-tetramethylpiperidine, 4-crotonoyloxy-2,2,6,6-tetramethylpiperidine, 4-crotonoylamino-2,2,6,6-tetramethylpiperidine, 1-(meth)acryloyl-4-(meth)acryloylamino-2,2,6,6-tetramethylpiperidine, 1-(meth)acryloyl-4-cyano-4-(meth)acryloylamino-2,2,6,6-tetramethylpiper idine, and 1-crotonoyl-4-crotonoyloxy-2,2,6,6-tetramethylpiperidine. These may be used either alone respectively or in combinations with each other.

If the polymerizable unsaturated monomer (b) having a reactive group, such as (i) to (vi) above, is used, the reactive group can be introduced into the (meth)acrylate ester-based polymer (I). In the case, where the (meth)acrylate ester-based polymer (I) in the present invention has the reactive group, the use thereof jointly with the crosslinking agent having at least two functional groups that are reactable with the reactive group has the advantage of providing enablement for easily crosslinking the (meth)acrylate ester-based polymer (I) to enhance such as weather resistance, water resistance, impact resistance, and processability of the resulting coating film.

The use of the polymerizable unsaturated monomer having the acidic functional group as exemplified by (ii) above from among the polymerizable unsaturated monomers as exemplified as (i) to (vi) above has the advantage of providing enablement for not only introducing the acidic functional group as the reactive group into the (meth)acrylate ester-based polymer (I) but also enhancing such as the adhesion to polar substrates (e.g. metals), the pigment dispersibility, and the solubility or dispersibility into polar solvents (e.g. water) due to this acidic functional group. In addition, the acidic functional group, which has been introduced into the (meth)acrylate ester-based polymer (I) by the polymerizable unsaturated monomer having the acidic functional group as exemplified by (ii) above, is also favorably useful as an internal catalyst for a crosslinking reaction between the crosslinking agent and the (meth)acrylate ester-based polymer (I) as obtained by using the polymerizable unsaturated monomer having the alcoholic hydroxyl group as exemplified by (i) above.

Of the above other polymerizable unsaturated monomers (c), those which are selected from the group consisting of the (meth)acrylic acid alkyl esters, the vinyl compounds, the silicon-containing polymerizable unsaturated monomers, the fluorine-containing polymerizable unsaturated monomers, the ultraviolet-absorbent polymerizable unsaturated monomers, and the ultraviolet-stable polymerizable unsaturated monomers are used favorably for sufficient exhibition of the effects of the resin composition according to the present invention although there is no especial limitation. Particularly favorable are the (meth)acrylic acid alkyl esters and the vinyl compounds.

The amount of each of the above polymerizable unsaturated monomers which are favorably contained in the aforementioned monomer components, in other words; the content of each of the polymerizable unsaturated monomer (a) denoted by the general formula (1), the polymerizable unsaturated monomer (b) having a reactive group, and the other polymerizable unsaturated monomer (c) in the monomer components, is not especially limited, but, in view of the properties of the (meth)acrylate ester-based polymer (I) as obtained by the present invention and further the properties of the finally obtained resin composition, it is as follows: the content of the polymerizable unsaturated monomer (a), denoted by the general formula (1), in the monomer components is as stated above; and the content of the polymerizable unsaturated monomer (b) having a reactive group is favorably in the range of 1.0 to 40.0 weight %, more favorably 3.0 to 40.0 weight %, still more favorably 5.0 to 35.0 weight %, of the monomer components as used; and the content of the other polymerizable unsaturated monomer (c) is favorably in the range of 0 to 94.0 weight %, more favorably 0 to 87.0 weight %, still more favorably 0 to 75.0 weight %, of the monomer components as used.

The polymerization process for obtaining the (meth)acrylate ester-based polymer (I) in the present invention is not especially limited, but favorably usable examples thereof include conventional various processes which utilize such as heat, ultraviolet rays, radiations, electron beams, and radical polymerization initiators, namely, such as solution polymerization processes, emulsion polymerization processes, suspension polymerization processes, bulk polymerization processes, nonaqueous dispersion polymerization processes, and deposition polymerization processes.

In the case where the polymer (I) in the present invention is obtained by using such as the solution polymerization process from among the above polymerization processes, usable solvents (polymerization solvents) are not especially limited, but favorable specific examples thereof include nonreactive solvents such as organic solvents and water wherein examples of the organic solvents include: aromatic solvents (hydrocarbon solvents) such as toluene, xylene, n-hexane, cyclohexane, industrial gasoline, and reformate; ester solvents such as ethyl acetate, butyl acetate, and propylene glycol methyl ether acetate; ketone solvents such as methyl ethyl ketone, ethyl acetoacetate, acetylacetone, diacetone alcohol, methyl isobutyl ketone, methyl amyl ketone, and acetone; aliphatic alcohol solvents such as methanol, ethanol, isopropyl alcohol and n-butanol; alkylene glycol monoalkyl ether solvents such as ethylene glycol monomethyl ether, diethylene glycol monomethyl ether, and propylene glycol monomethyl ether. These may be used either alone respectively or in combinations with each other.

In the case where the polymer (I) in the present invention is obtained by using such as the emulsion polymerization process from among the above polymerization processes, examples of usable emulsifiers include anionic surfactants, cationic surfactants, nonionic surfactants, amphoteric surfactants, high-molecular surfactants, and polymerizable surfactants having at least one polymerizable carbon-carbon unsaturated bond per molecule. These may be used either alone respectively or in combinations with each other.

The aforementioned anionic surfactant is not especially limited, but favorable specific examples thereof include: alkaline-metal alkyl sulfates such as sodium dodecyl sulfate and potassium dodecyl sulfate; ammonium alkyl sulfates such as ammonium dodecyl sulfate; sodium dodecyl polyglycol ether sulfate, sodium sulfocinnoate, and alkaline-metal salts of sulfonated paraffin; alkylsulfonates such as ammonium salts of sulfonated paraffin; fatty acid salts such as sodium laurate; alkylarylsulfonates such as sodium dodecylbenzenesulfonate and alkaline-metal sulfates of alkali phenol hydroxyethylene; higher-alkylnaphthalenesulfonate salts, naphthalenesulfonic acid-formalin condensation products, dialkylsulfosuccinate salts, polyoxyethylene alkyl sulfate salts, and polyoxyethylene alkylaryl sulfate salts.

The aforementioned cationic surfactant is not especially limited, but favorable specific examples thereof include triethanolamine oleate and triethanolamine abietate.

The aforementioned nonionic surfactant is not especially limited, but favorable specific examples thereof include: polyoxyethylene alkyl ethers, polyoxyethylene alkyl aryl ethers, sorbitan fatty acid esters, polyoxyethylene sorbitan fatty acid esters, and fatty acid monoglycerides such as glycerol monolaurate; poly(oxyethylene-oxypropylene) copolymers, and products formed by condensation of ethylene oxide with fatty acid amines, amides, or acids.

The aforementioned high-molecular surfactant is not especially limited, but favorable specific examples thereof include: poly(vinyl alcohol), poly(sodium (meth)acrylate), poly(potassium (meth)acrylate), poly(ammonium (meth)acrylate), poly(hydroxyethyl (meth)acrylate), poly(hydroxypropyl (meth)acrylate), copolymers of at least two kinds of polymerizable monomers (which are structural units of these polymers) or copolymers of them with other monomers, and phase transfer catalysts such as crown ethers.

The aforementioned polymerizable surfactant is not especially limited, but favorable specific examples thereof include: anionic polymerizable surfactants such as sodium propenyl-2-ethylhexylbenzenesulfosuccinate, sulfate esters of polyoxyethylene (meth)acrylate, ammonium polyoxyethylene alkylpropenyl ether sulfates, and phosphate esters of polyoxyethylene (meth)acrylate; and nonionic polymerizable surfactants such as polyoxyethylene alkylbenzene ether (meth)acrylate and polyoxyethylene alkyl ether (meth)acrylate.

The amount of the aforementioned emulsifier, as used, is not especially limited, but is specifically in the range of favorably 0.1 to 20 weight %, more favorably 0.2 to 10 weight %, still more favorably 0.3 to 6 weight %, relative to the total weight of the monomer component including the polymerizable unsaturated monomer of the general formula (1) as an essential component. In the case where the amount of the aforementioned emulsifier as used is smaller than 0.1 weight % relative to the total weight of the monomer component, there are disadvantages of involving the deterioration of the dispersing stability of the polymer in the resin composition according to the present invention. In the case where the amount of the aforementioned emulsifier is larger than 20 weight %, there are disadvantages of involving the deterioration of such as water resistance of a coating film as formed when the aforementioned resin composition is favorably used for such as paints.

As to the aforementioned emulsion polymerization, the reaction temperature in the step of polymerizing the monomer component is favorably in the range of 10 to 100° C., more favorably 40 to 90° C.

The organic solvents or water, which are favorably used for the above solution polymerization or emulsion polymerization, are favorably used in such an amount that the weight percentage of the monomer components including such as polymerizable unsaturated monomer (a) of the general formula (1) can be in the range of 5 to 90 weight %, more favorably 10 to 90 weight %, still more favorably 20 to 80 weight %, of the resin composition according to the present invention.

The aforementioned radical polymerization initiator, as used for the above various polymerization processes such as solution polymerization or emulsion polymerization, is not especially limited, but favorable specific examples thereof include: azo initiators such as 2,2'-azobisisobutyronitrile, 2,2'-azobis(2-amidinopropane) dihydrochloride, 4,4'-azobis(4-cyanopentanoic acid), 2,2'-azobis(2-methylbutyronitrile), and 2,2'-azobis(2,4-dimethylvaleronitrile); and peroxide initiators such as persulfate salts (e.g. potassium persulfate), hydrogen peroxide, peracetic acid, benzoyl peroxide, di-t-butyl peroxide, 1,1-bis(t-butylperoxy)-3,3,5-trimethylcyclohexane, t-butylperoxy-2-ethylhexanoate, t-butyl hydroperoxide, lauryl peroxide, and benzoyl peroxide. In addition, on this occasion, it is also favorable to form redox initiators by combining the above peroxide initiators with reducing agents such as sodium hydrogensulfite, L-ascorbic acid, Rongalit, and sodium metabisulfite.

In addition, in the case where a polymerization promotor is used, this polymerization promotor is not especially limited, but favorable examples thereof include various transition metal ions, specifically, such as ferric sulfate, cupric sulfate, ferric chloride, and cupric chloride.

The aforementioned radical polymerization initiator is used in a ratio of favorably 0.01 to 20 weight %, more favorably 0.05 to 10 weight %, still more favorably 0.1 to 10 weight %, to the total weight of the monomer component including the polymerizable unsaturated monomer (a) of the general formula (1) as an essential component. In the case of such a range of the use, excellent results are provided with regard to the yield of the resulting (meth)acrylate ester-based polymer (I) and the economy.

In the case where the above various polymerization processes are used, furthermore, such as a chain transfer agent or adjusting agent is favorably usable for the purpose of adjusting the molecular weight, if necessary.

Although not especially limited, specific examples of the favorably usable chain transfer agent or adjusting agent include: alcohols such as methanol, ethanol, propanol, and butanol; ketones such as acetone, methyl ethyl ketone, cyclohexanone, and acetophenone; aldehydes such as acetoaldehyde, n-butraldehyde, furfural, and benzaldehyde; mercaptans such as dodecylmercaptan, n-dodecylmercaptan, n-octylmercaptan, 2-ethylhexylthioglycolate esters, laurylmercaptan, thioglycolic acid, octyl thioglycolate, thioglycerol, and 2-mercaptoethanol; thiophenol, and α-methylstyrene dimer.

The aforementioned chain transfer agent or adjusting agent is used in a ratio of favorably 0.01 to 10 weight %, more favorably 0.02 to 5 weight %, to the total weight of the monomer component including the polymerizable unsaturated monomer (a) of the general formula (1) as an essential component.

The (meth)acrylate ester-based polymer (I) in the present invention has a number-average molecular weight in the range of favorably 1,000 to 10,000,000, more favorably 1,500 to 5,000,000, still more favorably 2,000 to 5,000,000. In the case where the aforementioned number-average molecular weight deviates from the above ranges, there is an unfavorable possibility that the properties which can be exhibited by the above (meth)acrylate ester-based polymer (I) and further the properties of the finally obtained resin composition according to the present invention might be deteriorated.

The (meth)acrylate ester-based polymer (I) in the present invention has a glass transition temperature Tg (° C.) in the range of favorably −30 to 90° C., more favorably −20 to 80° C., still more favorably −10 to 70° C., particularly favorably 10 to 60° C. In the case where the aforementioned glass transition temperature Tg deviates from the above ranges, there is an unfavorable possibility that the properties which can be exhibited by the above (meth)acrylate ester-based polymer (I) and further the properties of the finally obtained resin composition according to the present invention might be deteriorated.

((Meth)acrylate Ester-based Resin Composition)

Hereinafter, a detailed explanation is made about specific examples of the composition according to the present invention.

It is favorable that the (meth)acrylate ester-based resin composition according to the present invention comprises a crosslinking agent along with the (meth)acrylate ester-based polymer (I) as essential components wherein the crosslinking agent has at least two functional groups that are reactable with the reactive group of this polymer (I).

The (meth)acrylate ester-based resin composition according to the present invention is enough if it favorably comprises the (meth)acrylate ester-based polymer (I) and the aforementioned crosslinking agent. In particular, the shape or form of the (meth)acrylate ester-based resin composition is not especially limited, but may be liquid, solid, powdery, or in any other form. Furthermore, in the case where the (meth)acrylate ester-based resin composition is liquid, the (meth)acrylate ester-based resin composition may be either what is called a homogeneous resin composition in which the (meth)acrylate ester-based polymer (I) is entirely dissolved in the solvent, or what is called a heterogeneous resin composition in which the (meth)acrylate ester-based polymer (I) is not entirely dissolved but dispersed in the solvent (dispersion medium). However, there is no especial limitation thereto.

Favorable specific examples of processes for obtaining the aforementioned homogeneous resin composition include: a process comprising the steps of synthesizing the (meth)acrylate ester-based polymer (I) by such as emulsion polymerization, suspension polymerization, or bulk polymerization, and then isolating the synthesized (meth) acrylate ester-based polymer (I), and then entirely dissolving the isolated (meth)acrylate ester-based polymer (I) into such as organic solvents to produce a solution type resin composition; and a process comprising the steps of synthesizing the (meth)acrylate ester-based polymer (I) by solution polymerization, and then, if necessary, newly adding another component to the resultant solution type or pasty resin composition to produce a solution type resin composition. However, there is no especial limitation thereto.

Favorable specific examples of processes for obtaining the aforementioned heterogeneous resin composition include: a process comprising the steps of synthesizing the (meth)acrylate ester-based polymer (I) by such as solution polymerization, bulk polymerization, or deposition polymerization, and then isolating the synthesized (meth) acrylate ester-based polymer (I), and then post-dispersing the isolated (meth)acrylate ester-based polymer (I) into a dispersion medium to produce a resin composition as a dispersion; and a process comprising the steps of synthesizing the (meth)acrylate ester-based polymer (I) by emulsion polymerization, suspension polymerization, or nonaqueous dispersion polymerization, and then, if necessary, newly adding another component to the resultant resin composition standing in a state of a dispersion to produce a resin composition standing in a state of a dispersion. However, there is no especial limitation thereto.

The content of the (meth)acrylate ester-based polymer (I) in the (meth)acrylate ester-based resin composition according to the present invention is favorably in the range of 5 to 90 weight %, more favorably 20 to 85 weight %, particularly favorably 50 to 80 weight %, of the (meth)acrylate ester-based resin composition. In the case where the content of the (meth)acrylate ester-based polymer (I) deviates from the above ranges, there is an unfavorable possibility that the resin composition according to the present invention could not sufficiently exhibit its various properties.

The content of the crosslinking agent in the (meth) acrylate ester-based resin composition according to the present invention is favorably in the range of 1.0 to 40.0 weight %, more favorably 5.0 to 40.0 weight %, of the (meth)acrylate ester-based resin composition. In the case where the content of the crosslinking agent deviates from the above ranges, there is an unfavorable possibility that the resin composition according to the present invention could not sufficiently exhibit its various properties.

The (meth)acrylate ester-based polymer (I), which is contained as an essential component in the (meth)acrylate ester-based resin composition according to the present invention, favorably has a reactive. group. This reactive group is not especially limited, but, as is mentioned above, favorable examples thereof include an alcoholic hydroxyl group, an acidic functional group, an epoxy group, an active carbonyl group, an oxazoline group, and an isocyanate group.

Similarly, the aforementioned crosslinking agent, which is contained as an essential component in the (meth)acrylate ester-based resin composition according to the present invention, is a compound having at least two functional groups that are reactable with the reactive group of the aforementioned polymer (I), and crosslinking agents which are favorable for the polymers having the above reactive groups can be exemplified as follows.

Acrylic Polyol

The (meth)acrylate ester-based polymer (I) is, for example, an acrylic polyol which is obtained by a process including the step of polymerizing monomer components including the polymerizable unsaturated monomer (a) and an alcoholic-hydroxyl-group-containing polymerizable unsaturated monomer as essential components.

Favorably usable as the aforementioned alcoholic-hydroxyl-group-containing polymerizable unsaturated monomer is at least one of those which are exemplified by (i) above of the polymerizable unsaturated monomers (b) having reactive groups.

In this case, favorable examples of the crosslinking agent include polyisocyanate compounds, blocked isocyanate compounds, and aminoplast resins, and at least one of them is favorably usable. These may be used either alone respectively or in combinations with each other.

Favorable examples of the polyisocyanate compounds as the aforementioned crosslinking agent include aliphatic, alicyclic, or aromatic polyisocyanate compounds such as trimethylene diisocyanate, 1,6-hexamethylene diisocyanate, (hydrogenated) tolylene diisocyanate, diphenylmethane diisocyanate, isophorone diisocyanate, and (hydrogenated) xylylene diisocyanate. These may be used either alone respectively or in combinations with each other.

Favorable examples of the blocked isocyanate compounds as the aforementioned crosslinking agent include compounds obtained by causing such as caprolactones (e.g. caprolactams), phenols (e.g. phenol), alcohols (e.g. tertiary alcohols), and oximes to react at terminals of the above polyisocyanate compounds.

Favorable examples of the aminoplast resins as the aforementioned crosslinking agent include methyl-etherated melamine resins, butyl-etherated melamine resins, hexamethoxymelamine resins, butyl-etherated benzoguanamine resins, butyl-etherated cyclohexylbenzoguanamine resins, and water-solubilized products of these resins. These may be used either alone respectively or in combinations with each other.

Acidic-functional-group-containing Resin

The (meth)acrylate ester-based polymer (I) is, for example, an acidic-functional-group-containing resin which is obtained by a process including the step of polymerizing monomer components including the polymerizable unsaturated monomer (a) and an acidic-functional-group-containing polymerizable unsaturated monomer as essential components.

In the case where the reactive group is an acidic functional group such as a carboxyl group, sulfonic acid group, or phosphoric acid group, favorably usable as the aforementioned acidic-functional-group-containing monomer is at least one of the acidic-functional-group-containing polymerizable unsaturated monomers which are exemplified by (ii) above of the polymerizable unsaturated monomers (b) having reactive groups.

In this case, favorable examples of the crosslinking agent include epoxy-group-containing compounds, metal chelate compounds, polyisocyanate compounds, oxazoline-group-containing compounds, and carbodiimide-group-containing compounds, and at least one of them is favorably usable.

Favorable examples of the epoxy-group-containing compounds as the aforementioned crosslinking agent include bisphenol A type epoxy resins, bisphenol F type epoxy resins, phenol novolac type epoxy resins, cresol novolac type epoxy resins, glycidylamine type epoxy resins, alicyclic epoxy compounds, and hydrogenated bisphenol A type epoxy resins. These may be used either alone respectively or in combinations with each other. Of them, particularly, the alicyclic epoxy compounds and the hydrogenated bisphenol A type epoxy resins are favorable.

Favorable examples of the metal chelate compounds as the aforementioned crosslinking agent include: aluminum chelates such as aluminum tris(acetylacetonate); acetylacetone compounds of such as titanium, zirconium, copper, cobalt, and zinc; and ammonia-coordinated compounds such as polyamines. These may be used either alone respectively or in combinations with each other.

Favorably usable examples of the polyisocyanate compounds as the aforementioned crosslinking agent include the same as those of the aforementioned "polyisocyanate compounds as the crosslinking agent in the explanation about the acrylic polyol". These may be used either alone respectively or in combinations with each other.

Favorable examples of the oxazoline-group-containing compounds as the aforementioned crosslinking agent include 2,2'-bis(2-oxazoline), 2,2'-methylene-bis(2-oxazoline), 2,2'-ethylene-bis(2-oxazoline), 2,2'-trimethylene-bis(2-oxazoline), 2,2'-tetramethylene-bis(2-oxazoline), 2,2'-hexamethylene-bis(2-oxazoline), 2,2'-octamethylene-bis(2-oxazoline), 2,2'-ethylene-bis(4,4'-dimethyl-2-oxazoline), 2,2'-p-phenylene-bis(2-oxazoline), 2,2'-m-phenylene-bis(4,4'-dimethyl-2-oxazoline), bis(2-oxazolinylcyclohexane) sulfide, and bis(2-oxazolinylnorbornane) sulfide. These may be used either alone respectively or in combinations with each other.

Favorable examples of the carbodiimide-group-containing compounds as the aforementioned crosslinking agent include Carbodirite V-02, V-04, V-06, E-01, and E-02 (produced by Nisshin Boseki Co., Ltd.). These may be used either alone respectively or in combinations with each other.

Epoxy-group-containing Resin

The (meth)acrylate ester-based polymer (I) is, for example, an epoxy-group-containing resin which is obtained by a process including the step of polymerizing monomer components including the polymerizable unsaturated monomer (a) and an epoxy-group-containing polymerizable unsaturated monomer as essential components.

Favorably usable as the aforementioned epoxy-group-containing monomer is at least one of the polymerizable unsaturated monomers which are exemplified by (iii) above of the polymerizable unsaturated monomers (b) having reactive groups.

In this case, favorable examples of the crosslinking agent include carboxyl-group-containing compounds, thiol-group-containing compounds, and polyamine compounds, and at least one of them is favorably usable.

Favorable examples of the carboxyl-group-containing compounds as the aforementioned crosslinking agent include: carboxyl-group-containing polyesters obtained by condensation polymerization of unsaturated polybasic acids (represented by such as maleic anhydride, fumaric acid, citraconic acid, and itaconic acid) or saturated polybasic acids (represented by such as phthalic anhydride, isophthalic acid, terephthalic acid, orthophthalic acid, naphthalenedicarboxylic acid, tetrahydrophthalic anhydride, hexahydrophthalic anhydride, and succinic acid) with polyhydric alcohol components (represented by such as ethylene glycol, propylene glycol, 1,3-propanediol, 1,4-butanediol, 1,3-butanediol, 1,5-pentanediol, 1,6-hexanediol glycol, diethylene glycol, triethylene glycol, 1,4-cyclohexanedimethanol, polyethylene glycol, polypropylene glycol, and polytetramethylene glycol); and polycarboxylic acids. Of them, particularly, the polycarboxylic acids are favorable.

Favorable examples of the polycarboxylic acids include: aliphatic dibasic acids (e.g. adipic acid, sebacic acid, azelaic acid, decanedicarboxylic acid, hexadecanedicarboxylic acid, eicosanedicarboxylic acid, tetraeicosanedicarboxylic acid, maleic acid, citraconic acid, itaconic acid, glutaric acid, suberic acid, pimelic acid, eicosanedioic acid, dodecanedioic acid) or their ester compounds and acid anhydrides; aromatic polycarboxylic acids (e.g. isophthalic acid, phthalic acid, trimellitic acid, piperic acid, pyromellitic acid) or their ester compounds and acid anhydrides; alicyclic dibasic acids (e.g. hexahydrophthalic acid, hexahydroisophthalic acid, methylhexahydrophthalic acid, tetrahydrophthalic acid) or their ester compounds and acid anhydrides; polybasic acids (e.g. citric acid, butanetetracarboxylic acid) and those which have at least two carboxyl groups per molecule among the polymerizable unsaturated monomers which are exemplified by (ii) above, or their ester compounds and acid anhydrides. These may be used either alone respectively or in combinations with each other.

Favorable examples of the thiol-group-containing compounds as the aforementioned crosslinking agent include triazinethiols. These may be used either alone respectively or in combinations with each other.

Favorable examples of the polyamine compounds as the aforementioned crosslinking agent include: linear aliphatic polyamines such as diethylenetriamine (DETA), triethylenetetramine (TETA), and polyoxypropylenetriamine; and cyclic amines such as menthenediamine, isophoronediamine, diaminodicyclohexylmethane, and bis(aminomethyl)cyclohexane. These may be used either alone respectively or in combinations with each other.

Active-carbonyl-group-containing Resin

The (meth)acrylate ester-based polymer (I) is, for example, an active-carbonyl-group-containing resin which is obtained by a process including the step of polymerizing monomer components including the polymerizable unsaturated monomer (a) and an active-carbonyl-group-containing polymerizable unsaturated monomer as essential components.

Favorably usable as the aforementioned active-carbonyl-group-containing polymerizable unsaturated monomer is at least one of the polymerizable unsaturated monomers which are exemplified by (v) above of the polymerizable unsaturated monomers (b) having reactive groups.

In this case, favorable examples of the crosslinking agent include hydrazino-group-containing compounds, and at least one of them is favorably usable.

Favorable examples of the hydrazino-group-containing compounds as the aforementioned crosslinking agent include dicarboxylic hydrazides having, for example, 2 to 10, particularly, 4 to 6 carbon atoms (e.g. oxalic dihydrazide, malonic dihydrazide, succinic dihydrazide, glutaric dihydrazide, adipic dihydrazide, sebacic dihydrazide, maleic dihydrazide, fumaric dihydrazide, itaconic dihydrazide) and aliphatic water-soluble dihydrazines having 2 to 4 carbon atoms (e.g. ethylene-1,2-dihydrazine, propylene-1,3-dihydrazine, butylene-1,4-dihydrazine). These may be used either alone respectively or in combinations with each other.

Oxazoline-group-containing Resin

The (meth)acrylate ester-based polymer (I) is, for example, an oxazoline-group-containing resin which is obtained by a process including the step of polymerizing monomer components including the polymerizable unsaturated monomer (a) and an oxazoline-group-containing polymerizable unsaturated monomer as essential components.

Favorably usable as the aforementioned oxazoline-group-containing polymerizable unsaturated monomer is at least one of the polymerizable unsaturated monomers which are exemplified by (vi) above of the polymerizable unsaturated monomers (b) having reactive groups.

In this case, favorable examples of the crosslinking agent include carboxyl-group-containing compounds, epoxy-group-containing compounds, and thiol-group-containing compounds, and at least one of them is favorably usable.

Favorably usable examples of the carboxyl-group-containing compounds as the aforementioned crosslinking agent include the same as those of the aforementioned "carboxyl-group-containing compounds as the crosslinking agent in the explanation about the epoxy-group-containing resin". These may be used either alone respectively or in combinations with each other.

Favorably usable examples of the epoxy-group-containing compounds as the aforementioned crosslinking agent include the same as those of the aforementioned "epoxy-group-containing compounds as the crosslinking agent in the explanation about the acidic-functional-group-containing resin". These may be used either alone respectively or in combinations with each other.

Favorable examples of the thiol-group-containing compounds as the aforementioned crosslinking agent include triazinethiols. These may be used either alone respectively or in combinations with each other.

Isocyanate-group-containing Resin

The (meth)acrylate ester-based polymer (I) is, for example, an isocyanate-group-containing resin which is obtained by a process including the step of polymerizing monomer components including the polymerizable unsaturated monomer (a) and an isocyanate-group-containing polymerizable unsaturated monomer as essential components.

Favorably usable as the aforementioned isocyanate-group-containing polymerizable unsaturated monomer is at least one of the polymerizable unsaturated monomers which are exemplified by (iv) above of the polymerizable unsaturated monomers (b) having reactive groups.

In this case, favorable examples of the crosslinking agent include hydroxyl-group-containing compounds and amino-group-containing compounds, and at least one of them is favorably usable.

Favorable examples of the hydroxyl-group-containing compounds as the aforementioned crosslinking agent include combined resins such as acrylic polyol resins, polyester resins, polyether resins (e.g. polyethylene ethers, polypropylene ethers), epoxy resins, urethane resins, and acrylic urethane resins. These may be used either alone respectively or in combinations with each other.

Favorable examples of the amino-group-containing compounds as the aforementioned crosslinking agent include the same compounds as specific examples which are enumerated as the aforementioned "polyamine compounds as the crosslinking agent". These may be used either alone respectively or in combinations with each other.

In the case where the form of the (meth)acrylate ester-based resin composition according to the present invention is a liquid, an organic solvent and/or water is favorably used as the solvent or dispersion medium which is contained as a component in the aforementioned resin composition. Although there is no especial limitation, specific examples thereof include organic solvents and water wherein examples of the organic solvents include: aromatic solvents such as toluene, xylene, industrial gasoline, and reformate; ester solvents such as ethyl acetate, butyl acetate, and propylene glycol methyl ether acetate; ketone solvents such as methyl ethyl ketone, methyl isobutyl ketone, and methyl amyl ketone; aliphatic alcohol solvents such as isopropyl alcohol and n-butanol; alkylene glycol monoalkyl ether solvents such as ethylene glycol monomethyl ether, diethylene glycol monomethyl ether, and propylene glycol monomethyl ether. One or two or more of them are favorably usable.

In the case where the form of the (meth)acrylate ester-based resin composition according to the present invention is a liquid, the content of the aforementioned solvent or dispersion medium in the aforementioned resin composition is favorably in the range of 10 to 94 weight %, more favorably 15 to 80 weight %, particularly favorably 20 to 70 weight %, of the (meth)acrylate ester-based resin composition. In the case where this content deviates from the above ranges, there is an unfavorable possibility that the resin composition according to the present invention could not sufficiently exhibit its various properties.

In the case where the form of the (meth)acrylate ester-based resin composition according to the present invention is a liquid, particularly, a dispersion, this resin composition may further comprise a compound having dispersibility or emulsifiability. Favorably usable examples of the compound having dispersibility or emulsifiability include polymers having dispersibility or emulsifiability in addition to so-called dispersants and emulsifiers.

Favorably usable examples of the aforementioned dispersants and emulsifiers include those which are aforementioned as emulsifiers that can be used for emulsion polymerization, namely, anionic surfactants, cationic surfactants, nonionic surfactants, amphoteric surfactants, high-molecular surfactants, and polymerizable surfactants having at least one polymerizable carbon-carbon unsaturated bond per molecule.

The aforementioned polymers having dispersibility or emulsifiability are not especially limited, but favorable specific examples thereof include (partially saponified or) carboxyl-group-modified poly(vinyl alcohol), methyl cellulose, hydroxyethyl cellulose, poly(vinylpyrrolidone), polycarboxylic acid-based high-molecular emulsifiers, EO/PO block polymers, poly(vinyl alcohol), poly(sodium (meth)acrylate), poly(potassium (meth)acrylate), poly (ammonium (meth)acrylate), poly(hydroxyethyl (meth) acrylate), poly(hydroxypropyl (meth)acrylate), copolymers of at least two kinds of polymerizable monomers (which are structural units of these polymers) or copolymers of them with other monomers, and phase transfer catalysts such as crown ethers. These may be used either alone respectively or in combinations with each other.

If necessary, fitly, the (meth)acrylate ester-based resin composition according to the present invention may favorably further comprise various paint additives such as pigments, aggregates, fillers, curing catalysts, modifying agents, leveling agents, dispersants, plasticizers, stabilizers, antioxidants, pinhole inhibitors, ultraviolet absorbents as added, ultraviolet stabilizers as added, and dyes (wherein the additives are not limited thereto). These may be used either alone respectively or in combinations with each other.

As is mentioned above, the (meth)acrylate ester-based resin composition according to the present invention can favorably further comprise the pigment and the aggregate.

The aforementioned pigment is not especially limited in kind, but favorable specific examples thereof include: inorganic pigments such as white pigments (e.g. titanium oxide, antimony trioxide; zinc white, lithopone, white lead) and color pigments (e.g. carbon black, chrome yellow, molybdate orange, red iron oxide); and organic pigments such as azo compounds (e.g. benzidine, Hansa yellow) and phthalocyanines (e.g. phthalocyanine blue). These may be used either alone respectively or in combinations with each other.

In the case where the (meth)acrylate ester-based resin composition according to the present invention is, for example, used as paints, pigments of which the weather resistance is so good as not to deteriorate the weather resistance of the resulting paint film are desirably selected from among the aforementioned pigments. For example, as to the titanium oxide which is a white pigment, the use of rutile type titanium oxide is preferable to the use of anatase type titanium oxide in respect to the weather resistance of the resulting paint film. In addition, as to the rutile type titanium oxide, chlorine process titanium oxide is preferable to sulfuric acid process titanium oxide in respect to being able to prolong the period of time of retaining and exhibiting the weather resistance.

As to the aforementioned aggregate, its kind may be either a transparent aggregate or a color aggregate. Although not especially limited, favorable specific examples of the transparent aggregate include feldspar, silica sand, silica stone, crystalline lime stone sand, glass beads, and synthetic resin beads, and favorable specific examples of the color aggregate include marble powder, granite powder, serpetinite, fluorite, color silica sand powder, and color pottery powder. These may be used either alone respectively or in combinations with each other.

In the case where the (meth)acrylate ester-based resin composition according to the present invention contains the aforementioned additives such as pigments, aggregates, and fillers, the content of these additives in the resin composition is favorably less than 40 weight % for uses for such as clear paints, and further is favorably in the range of 5 to 80 weight %, more favorably 10 to 70 weight %, still more favorably 20 to 60 weight %, for uses for such as enamel paints, in order for the additives to sufficiently exhibit their effects.

As is mentioned above, the (meth)acrylate ester-based resin composition according to the present invention can favorably further comprise the curing catalyst. This case has the advantage in that it is possible to promote a crosslinking reaction between the (meth)acrylate ester-based polymer (I) and the crosslinking agent which are essential components of the(meth)acrylate ester-based resin composition according to the present invention.

The aforementioned curing catalyst is not especially limited, but favorable specific examples thereof include: organic sulfonic acid compounds such as dodecylbenzenesulfonic acid, p-toluenesulfonic acid, 1-naphthalenesulfonic acid, and 2-naphthalenesulfonic acid; mixtures or reaction products of the aforementioned organic sulfonic acid compounds with nitrogen-atom-containing compounds (e.g. 1-amino-2-propanol, monoethanolamine, diethanolamine, 2-(methylamino)ethanol, 2-dimethylmethanolamine, 2-amino-2-methyl-1-propanol, diisopropanolamine, 3-aminopropanol, 2-methylamino-2-methylpropanol, morpholine, oxazolidine, 4,4-dimethyloxazolidine, 3,4,4-trimethyloxazolidine); phosphoric acid or phosphate esters, such as phosphoric acid, monomethyl phosphate, monoethyl phosphate, monobutyl phosphate, monooctyl phosphate, monododecyl phosphate, dimethyl phosphate, diethyl phosphate, dibutyl phosphate, dioctyl phosphate, and didodecyl phosphate; addition reaction products of epoxy compounds (e.g. propylene oxide, butylene oxide, cyclohexene oxide, glycidyl methacrylate, glycidol, acryl glycidyl ether, 3-glycidoxypropyltrimethoxysilane, 3-glycidoxypropyltriethoxysilane, 3-glycidoxypropyltrimethyldimethoxysilane, CARDURA E produced by Yuka Shell Epoxy Co., Ltd., Epikote 828 produced by Yuka Shell Epoxy Co., Ltd., Epikote 1001 produced by Yuka Shell Epoxy Co., Ltd.) with phosphoric acid and/or monophosphate esters; amines such as hexylamine, di-2-ethylhexylamine, N,N-dimethyldodecylamine, DABCO, DBU, morpholine, and diisopropanolamine; reaction products of these amines with acidic phosphate esters; alkaline compounds such as sodium hydroxide and potassium hydroxide; quaternary ammonium salts such as benzyltriethylammonium chloride or bromide and tetrabutylammonium chloride or bromide; phosphonium salts; divalent tin compounds such as tin octylate and tin stearate; tetravalent organotin compounds such as dibutyltin compounds (e.g. dibutyltin dioctoate, dibutyltin dilaurate, dibutyltin diacetate, dibutyltin diacetylacetonate, dibutyltin bistriethoxysilicate, dibutyltin distearate, dibutyltin maleate) and dioctyltin compounds (e.g. dioctyltin dilaurate, dioctyltin distearate, dioctyltin maleate); organotitanate compounds such as tetramethoxytitanium and tetrastearyloxytitanium; organoaluminum compounds such as aluminum isopropoxide and aluminum acetylacetonate; and organozirconium compounds such as zirconia stearate and zirconium tetraacetylacetonate. These may be used either alone respectively or in combinations with each other.

As is mentioned above, the (meth)acrylate ester-based resin composition according to the present invention can favorably further comprise the modifying agent, fitly if necessary.

The aforementioned modifying agent is not especially limited, but favorable specific examples thereof include polystyrene resins, polyethylene resins, polypropylene resins, polyurethane resins, polyester resins, poly(vinyl alcohol) resins, acrylonitrile-butadiene-styrene resins, fluororesins, epoxy resins, alkyd resins, silicone resins, vinyl acetate resins, polyester-modified acrylic resins, condensed products of organosilicates, and polyether resins. These may be used either alone respectively or in combinations with each other.

In the case where the (meth)acrylate ester-based resin composition according to the present invention is cured, curing conditions (crosslinking reaction conditions) are not especially limited, and usually the resin composition may be cured at normal temperature or under heating, but specifically the curing temperature is, for example, in the, range of −20 to 300° C., favorably 0 to 250° C. In the case where the curing temperature is lower than −20° C., curing is so bad that the properties might not be exhibited. In the case where the curing temperature is higher than 300° C., organic chains decompose, so the properties might not be exhibited.

In addition, in the case where the (meth)acrylate ester-based resin composition according to the present invention is cured, it is allowed to use usually commonly known curing methods, of which the specific examples include: methods in which curing is carried out by irradiating ultraviolet rays or electron beams; methods in which curing is carried out by oxidation; and moisture curing methods. These may be used jointly with the above curing method by drying.

As is mentioned above, the (meth)acrylate ester-based resin composition according to the present invention comprises the (meth)acrylate ester-based polymer and the crosslinking agent, and this resin composition may be such that these various components can be mixed together when the resin composition is used. For example, the resin composition may be either a two-liquid type such that the components are mixed together just before the resin composition is used, or a one-liquid type such that the components are beforehand mixed together, and there is no especial limitation. However, for example, in the case where the components are mixed together at normal temperature, if the combination of the above polymer and the crosslinking agent causes unstableness as the reaction system, the mixing as the two-liquid type is considered preferable to that as the one-liquid type. Therefore, the mode to mix various components of the resin composition according to the present invention may fitly be judged while considering such as combination of the above polymer and the. crosslinking agent.

The above mode to mix various components is not especially limited, but, in the case where the (meth)acrylate ester-based resin composition according to the present invention is used as a solution type resin composition, examples of the above mixing mode include: 1) a mode in which both the above polymer and the crosslinking agent are simultaneously dissolved or dispersed into an identical solvent and thereby mixed together; 2) a mode in which the above polymer and the crosslinking agent are dissolved or dispersed into different solvents, and then both are mixed together; and 3) a mode in which either one of the above polymer and the crosslinking agent is dissolved or dispersed into a solvent and then mixed with the other. In addition, likewise, in the case where the resin composition is used as a powdery resin composition, this resin composition is powdered so as not to contain such as solvent, and examples of the mixing mode therefor include: 1) a mode in which the above polymer and the crosslinking agent are beforehand mixed together by such as melt-kneading or dissolution into a solvent, and the resultant mixture is powdered by pulverization or spraying; and 2) a mode in which the above polymer and the crosslinking agent are powdered separately from each other and then mixed together. The mixing mode is not especially limited, but a favorable mixing mode may be considered fitly according to in what property and state the resin composition according to the present invention is used.

(Uses)

The (meth)acrylate ester-based resin composition according to the present invention favorably has various excellent properties as a resin composition having a crosslinking type curability, and is more favorably excellent particularly in various properties such as weather resistance, heat resistance, water resistance, acid resistance, alkali resistance, warm water resistance, impact resistance, processability, flexibility, hardness, elongation, transparency, luster, fleshy property, mirroring property, pigment dispersibility, and driability. Therefore, although not especially limited, favorable examples of the purpose of using the aforementioned resin composition include the wide range of various uses such as coating agents (e.g. for films, plastics, glass, paper, fibers, leather), pressure sensitive adhesives, and adhesives in addition to various paints such as paints for building exteriors, paints for building materials, paints for metals, paints for plastics, heavy anticorrosive paints, and waterproof paints for roofs.

As is mentioned above, the (meth)acrylate ester-based resin composition according to the present invention may be a solution, solid, powder, or in any other form, and its form may be selected fitly for desired uses. Particularly in the case where the resin composition is prepared as a powdery resin composition, this resin composition is usable as a resin composition for powdery paints, in other words, as a powdery paint.

Similarly to conventional powdery paints, the above powdery paint is not especially limited, but is, for specific example, favorably usable for: surfaces of materials such as glass and heat-resistant plastics; surfaces of metallic materials such as steel, aluminum, zinc, tin, copper, and melt-galvanized steel; surfaces of materials obtained by subjecting these metallic materials to surface treatments such as zinc-phosphating; and surfaces of materials as subjected to coating treatments with such as primers (e.g. by electrodeposition paints), intermediate paints, and undercoat base paints. More specifically, the above powdery paint is favorably usable for the same uses as those of conventional powdery paints, such as automobiles, car parts, electrical home use products, electrical appliances, steel-made furniture, office supplies, plastic articles, building materials, and building exteriors, without especial limitation. Particularly, the above powdery paint is favorably usable for outer and inner plates of cars to which the smoothness of paint films is demanded.

Hereinafter, an explanation is made about the case where the (meth)acrylate ester-based resin composition according to the present invention is used as a powdery paint (a resin composition for powdery paints). As long as there is no especial limitation, the powdery paint as hereinafter referred to is that in the case where the resin composition according to the present invention is used as a powdery paint.

In the case where the powdery paint is coated onto surfaces of the above materials, an arrangement is usually made so that the thickness of the resultant paint film may be in the range of favorably 20 to 200 μm, more favorably 20 to 150 μm, after baking.

The method for coating the powdery paint is not especially limited, but favorable specific examples thereof include methods such as electrostatic spray coating, friction electrification spray coating, and flowing immersion coating.

The above baking is carried out for the purpose of forming a cured paint film after coating the powdery paint. The baking temperature is usually in the range of favorably 120 to 300° C., more favorably 120 to 200° C., still more favorably 140 to 200° C. In addition, the baking period of time is usually in the range of favorably 10 to 60 minutes, more favorably 10 to 50 minutes, at the above temperature.

The mixing ratio between the polymer (I) and the crosslinking agent, which are contained in the powdery paint, is set so that the equivalent ratio between the functional group in the polymer (I) and that in the crosslinking agent may be favorably in the range of ½ to ⅔, more favorably in the range of ⅔ to ⅜. In the case where the above mixing ratio is less than ½, inferior results might be provided with regard to such as the storage stability of the paint or the finished external appearance of the resulting paint film. In the case where the above mixing ratio is more than ⅔, sufficient crosslinking density might not be obtained, therefore inferior results might be provided with regard to such as weather resistance, acid resistance, and scratch resistance.

The glass transition temperature Tg (° C.) of the polymer (I), which is contained in the powdery paint, is favorably not lower than 40° C., more favorably not lower than 45° C., in view of blocking resistance as a powdery paint, and favorably not higher than 90° C., more favorably not higher than 80° C., in view of external appearance of the resulting paint film. Incidentally, the above glass transition temperature Tg is a numerical value which is given by converting a temperature (K), as calculated by Fox's equation below, into (° C.).

$$1/Tg=\Sigma(Wi/Tgi)$$

wherein: Wi is a mass distribution of monomer i; and Tgi is Tg of a homopolymer of the monomer i.

The number-average molecular weight (Mn) of the polymer (I), which is contained in the powdery paint, is favorably not lower than 2,000, more favorably not lower than 3,000, in view of blocking resistance and corrosion resistance, and favorably not higher than 20,000, more favorably not higher than 10,000, in view of external appearance of the resulting paint film.

As to the powdery paint, the process for powdering the resin composition is not especially limited, but favorable examples thereof include: i) a process in which the components which are used as the ingredients of the resin composition according to the present invention are premixed, and then the resultant premixture is melt-kneaded and then pulverized and then classified; ii) a process in which the components which are used as the ingredients of the resin composition according to the present invention are beforehand mixed in a solution state like the solvent type paint, and then the resultant mixture is powdered into fine particles by methods such as spray drying. In the process i), the pulverization step favorably goes by multistep in which coarse pulverization is carried out, and then fine pulverization is newly carried out. In addition, the powdered resin compositions as obtained by the processes i) and ii) has a volume-average particle diameter in the range of favorably 5 to 40 μm, more favorably 10 to 25 μm. In the case where the above volume-average particle diameter is smaller than 5 μm, the efficiency of coating by electrostatic coating might be bad. In the case where the above volume-average particle diameter is larger than 40 μm, the smoothness might be bad.

The polymer (I), as contained in the powdery paint, favorably has an epoxy group or hydroxyl group as the reactive group.

For making the above polymer (I) have the epoxy group as the reactive group, it is favorable to use the above (iii) polymerizable unsaturated monomer having the epoxy group as the polymerizable unsaturated monomer (b) and, particularly, glycidyl (meth)acrylate is more favorable. In addition, as to the crosslinking agent used in this case, it is favorable to use the carboxyl-group-containing compound which is mentioned above as what is favorably combined with the epoxy-group-containing resin. In this way, if the combination of the polymer (I) with the crosslinking agent is that of the polymer (I) having the epoxy group with the carboxyl-group-containing compound, then excellent properties such as corrosion resistance, weather resistance, and hardness can be afforded to the resulting paint film to obtain good external appearance of the paint film.

In the case where the above polymer (I) has the epoxy group as the reactive group, the content of the above (iii) polymerizable unsaturated monomer having the epoxy group in the monomer components for obtaining the polymer (I) is favorably in the range of 20 to 70 weight %, more favorably 25 to 45 weight %, of the monomer components. If the above content is not less than 20 weight %, the corrosion resistance and the hardness of the resulting paint film greatly increase. If the above content is not more than 70 weight %, the storage stability of the powdery paint and the external appearance of the resulting paint film are good.

For making the above polymer (I) have the hydroxyl group as the reactive group, it is favorable to use the above (i) polymerizable unsaturated monomer having the alcoholic hydroxyl group as the polymerizable unsaturated monomer (b) and, particularly, 2-hydroxyethyl methacrylate (HEMA) is more favorable. In addition, as to the crosslinking agent used in this case, it is favorable to use the blocked isocyanate compound which is mentioned above as what is favorably combined with the acrylic polyol. In this way, if the combination of the polymer (I) with the crosslinking agent is that of the polymer (I) having the hydroxyl group with the blocked isocyanate compound, then excellent properties such as impact resistance, weather resistance, and hardness can be afforded to the resulting paint film to obtain good external appearance of the paint film.

In the case where the above polymer (I) has the hydroxyl group as the reactive group, the content of the above (i)

polymerizable unsaturated monomer having the alcoholic hydroxyl group in the monomer components for obtaining the polymer (I) is favorably in the range of 10 to 65 weight %, more favorably 15 to 40 weight %, of the monomer components. If the above content is not less than 10 weight %, the corrosion resistance and the hardness of the resulting paint film greatly increase. If the above content is not more than 65 weight %, the storage stability of the powdery paint and the external appearance of the resulting paint film are good.

The polymer (I), as contained in the powdery paint, is favorably a product obtained by a process including the step of polymerizing monomer components including the (meth) acrylic acid alkyl ester and the styrenic monomer (among the above polymerizable unsaturated monomers (c)) as essential components. In the case where the (meth)acrylic acid alkyl ester is included in the monomer components, there are advantages in that excellent external appearance or weather resistance can be afforded to the resulting paint film. In the case where the (meth)acrylic acid alkyl ester is used, the content thereof in the monomer components is favorably in the range of 5 to 70 weight %, more favorably 10 to 60 weight %, of the entirety of the monomer components. The above (meth)acrylic acid alkyl ester is not especially limited, but more favorable of those which are enumerated above are methyl (meth)acrylate, ethyl (meth)acrylate, n-butyl (meth) acrylate, i-butyl (meth)acrylate, t-butyl (meth)acrylate, n-propyl (meth)acrylate, i-propyl (meth)acrylate, 2-ethylhexyl (meth)acrylate, lauryl (meth)acrylate, tridecyl (meth)acrylate, stearyl (meth)acrylate, cyclohexyl (meth) acrylate, and isobornyl (meth)acrylate.

Hereinafter, an explanation is made about a process for forming a paint film for cars in the case where the resin composition according to the present invention which is a powdery paint is used for forming a paint film for cars.

Favorable as the above process for forming a paint film for cars is also a forming process in either manner of a 1-coat manner in which a colored powdery paint is coated onto a coated product obtained by coating a substrate with an undercoat base paint and, if necessary, an intermediate paint; and a 2-coat manner in which a powdery paint is coated onto a surface of a film of a colored base coat paint. However, a forming process in a 2-coat-and-1-bake (2C1B) manner is particularly favorable for sufficient exhibition of the effects in the case where the resin composition according to the present invention is used as a powdery paint. Incidentally, in the 2-coat-and-1-bake (2C1B) manner, a color metallic paint or an aqueous color interference pattern paint is coated as an aqueous color base paint, and then, while the surface of the resultant paint film has not yet been cured, this surface of the paint film is coated with the powdery paint, and then both the powdery paint and the aqueous color base paint are simultaneously cured by heating.

As to the above 2C1B, specifically, there is the following mode for execution. In this mode, first, a metal- or plastic-made material (to be coated) (e.g. car body) is coated with the aqueous color base paint (having a solid content adjusted into the range of 10 to 60 weight %) by spray coating such as airless spray, air spray, or electrostatic coating (directly or after being coated with an undercoat base paint (e.g. cationic electrodeposition paint) and, if necessary, an intermediate paint and then cured) so that the thickness of a cured film of the aqueous color base paint will be in the range of 10 to 60 $\mu$m, favorably 10 to 40 $\mu$m. After the coating has been completed, the coated material is left alone at room temperature for about 1 to about 10 minutes or dried at 50 to 100° C. for about 1 to about 10 minutes. Thereafter, the surface of the uncured paint film is coated with the above powdery paint by methods such as electrostatic powder coating and friction electrification powder coating so that the total thickness of the resultant paint films will be in the range of 20 to 100 $\mu$m, favorably 30 to 80 $\mu$m. Then, both paint films are simultaneously cured by heating at 120 to 180° C. for about 10 to about 50 minutes.

(Effects and Advantages of the Invention)

The present invention can provide a novel (meth)acrylate ester-based resin composition which, for example, exhibits various good properties such as weather resistance, heat resistance, water resistance, acid resistance, alkali resistance, warm water resistance, impact resistance, processability, flexibility, hardness, elongation, transparency, luster, fleshy property, mirroring property, pigment dispersibility, and driability when being used, for example, as crosslinking type paints, adhesives, pressure sensitive adhesives, and fiber-processing materials, and has so low a resin viscosity as to be utilizable as a resin for coping with environmental pollution of such as low-VOC paints.

DETAILED DESCRIPTION OF THE PREFERRED EMBODIMENTS

Hereinafter, the present invention is more specifically illustrated by the following examples of some preferred embodiments in comparison with comparative examples not according to the invention. However, the invention is not limited thereto.

Incidentally, hereinafter, the "weight part(s)" might be referred to simply as "part(s)" for convenience' sake.

In addition, hereinafter, in the case where the notation form "(A/B)" is used as a notation for indicating a classification of the crosslinking system, A is a polymer and B is a crosslinking agent.

(Methods for Measuring Numerical Values of Properties of Resin)

(Measurement of Viscosity)

As to the solvent type resin, the viscosity was measured by Gardner's viscosity measurement method (using a Gardner-Holdt bubble viscometer, at 25° C.).

As to the resins other than the solvent type resin, the viscosity was measured at 30 min$^{-1}$, 25° C. with a BM type viscometer (produced by Tokyo Instruments Co., Ltd.), when the rotor was selected according to the viscosity.

(Nonvolatile Content)

About 1 g of specimen was weighed out and then dried in a hot-air drying oven of 105° C. for 1 hour. The resultant drying residue was taken as the nonvolatile content, and its ratio to what the weight of the specimen had been before the drying was indicated by weight %.

(Volume-average Particle Diameter)

The volume-average particle diameter was measured with a particle diameter measurement apparatus by the dynamic light scattering method (NICOMP Model 370, produced by HIAC/ROYCO INSTRUMENTS DIVISION Co., Ltd.).

(MFT: Minimum Film Formation Temperature)

The specimen was coated onto a glass plate (which was put on a thermal gradient testing machine) by using an applicator of 0.2 mm and then dried, and the temperature (° C.) at which the resultant coating film on the glass plate cracked was taken as the MFT.

(Number-average Molecular Weight: Mn)

The number-average molecular weight was measured by HLC-8020 Model gel permeation chromatography (using TDKgel G-5000HXL and TSKgel GMHXL-L in tandem; produced by TOSOH Corporation) (in terms of polystyrene).

(Acrylic Polyol/polyisocyanate Crosslinking System)

EXAMPLE 1
(Process for Producing Solvent Type Acrylic Polyol)

A four-necked flask, as equipped with a stirrer, a thermometer, a reflux condenser, a dropping funnel, and a nitrogen gas-introducing tube, was charged with 62 parts of xylene and 50 parts of butyl acetate and then heated to 105° C. under a nitrogen gas flow. Next, a mixture, comprising 43 parts of 4-methylcyclohexylmethyl methacrylate, 29 parts of methyl methacrylate, 8 parts of butyl acrylate, 1 part of methacrylic acid, 19 parts of 2-hydroxyethyl methacrylate,

EXAMPLES 2 TO 6 AND

COMPARATIVE EXAMPLES 1, 2

Polymers of Examples 2 to 6 and Comparative Examples 1, 2 were obtained in the same way as of Example 1 except that the polymerizable monomer components, the amount of the polymerization initiator, and the reaction temperature, as used in Example 1, were changed to those which are shown in Table 1. Their nonvolatile contents, viscosities, and number-average molecular weights are shown in Table 1. Furthermore, the same procedure of the prescription for paint preparation as of Example 1 was repeated to obtain two-liquid type urethane resin compositions.

TABLE 1

|  | Example 1 | Example 2 | Example 3 | Example 4 | Example 5 | Example 6 | Comparative Example 1 | Comparative Example 2 |
|---|---|---|---|---|---|---|---|---|
| 4M-CHM-MA | 43 | 50 | 5 | 40 | 40 | 45 | | |
| 4M-CHMA | | | 5 | 10 | | | | |
| CHMA | | | 5 | | 40 | | | 43 |
| MMA | 29 | 14 | 36 | | | | 46 | 20 |
| HEMA | 19 | 11 | 19 | | 19 | 14 | 19 | 19 |
| CHDM-MA | | 11 | | | | | | |
| BA | 8 | 10 | 29 | 26 | | | 15 | 15 |
| 2EHA | | | | | | 39 | | |
| MAA | 1 | 1 | 1 | 1 | 1 | 1 | 1 | 1 |
| HALS | | 2 | | 1 | 2 | 1 | 1 | 1 |
| RUVA | | 1 | | 2 | | | | |
| ABN-E | 1.75 | 1.75 | 1.75 | 1.75 | 1.75 | 1.0 | 1.75 | 1.75 |
| Reaction temperature (° C.) | 105 | 105 | 105 | 105 | 105 | 95 | 105 | 105 |
| NV (wt %) | 44.6 | 44.5 | 44.8 | 44.6 | 44.2 | 44.5 | 44.6 | 44.7 |
| Gardner viscosity (25° C.) | T–U | V–W | X–Y | T–U | $Z_2$–$Z_3$ | P–Q | W–X | T–U |
| Glass transition temperature (° C.) | 46 | 35 | — | — | — | −5 | 46 | 46 |
| Hydroxyl group value (solid content) | 80 | 80 | 80 | 80 | 80 | 60 | 80 | 80 |
| Mn | 7,300 | 7,800 | 7,200 | 7,000 | — | 12,300 | 7,400 | 7,000 | and 1.75 parts of ABN-E, was dropwise added into the flask over a period of 3 hours, and then the flask was retained at the same temperature as the above for 4 hours, thus obtaining an acrylic polyol resin liquid having a nonvolatile content of 44.6 weight %, a Gardner viscosity of T-U (25° C.), a hydroxyl group value of 80/solid content, and a glass transition temperature of 46° C. The number-average molecular weight of the resultant polymer was about 7,300.

(Prescription for Paint Preparation)

Titanium oxide (Tipaque CR-95, produced by Ishihara Sangyo Kaisha, Ltd.) was added to the aforementioned acrylic polyol so that the pigment concentration in the nonvolatile content would be 40 weight %, and the titanium oxide was well dispersed into the acrylic polyol with a sand mill, thus obtaining a dispersion (hereinafter referred to as liquid I). A multifunctional isocyanate (Sumidur N-3300, produced by Sumitomo-Bayer Urethane Co., Ltd.) was weighed out as liquid II in such an amount that the equivalent ratio of the isocyanate group to the hydroxyl group of the aforementioned acrylic polyol in the above dispersion (liquid I) would be 1:1. These liquids I and II were mixed together and then diluted to a spray-coatable viscosity with a thinner of toluene: butyl acetate=1:1, thus obtaining a paint composition containing a two-liquid type urethane resin paint composition as a vehicle component.

Incidentally, the abbreviations in Tables are as follows:

4M-CHM-MA: 4-methylcyclohexylmethyl methacrylate

4M-CHMA: 4-methylcyclohexylmethyl acrylate

CHMA: cyclohexyl methacrylate

MMA: methyl methacrylate

HEMA: 2-hydroxyethyl methacrylate

CHDM-MA: 4-hydroxymethylcyclohexylmethyl methacrylate

BA: n-butyl acrylate

2EHA: 2-ethylhexyl acrylate

MAA: methacrylic acid, AA: acrylic acid

HALS: 1,2,2,6,6-pentamethylpiperidinyl methacrylate

RUVA: 2-(2'-hydroxy-5-methacryloylethylphenyl)-2H-benzotriazole

ABN-E: 2,2'-azobis(2-methylbutyronitrile)

(Acrylic Polyol/melamine Resin)

EXAMPLE 7

Titanium oxide (Tipaque CR-95, produced by Ishihara Sangyo Kaisha, Ltd.) was added to the acrylic polyol resin liquid, as obtained in Example 1, so that the pigment concentration in the nonvolatile content would be 40 weight %, and the titanium oxide was well dispersed into the acrylic polyol with a sand mill, thus obtaining a dispersion. A melamine resin Cymel 303 (nonvolatile content=100 weight %, produced by MITSUI CYTEC LTD.) was weighed out in an amount of 25 parts per 75 parts of the nonvolatile content of the aforementioned acrylic polyol and then mixed with the above dispersion, and then the resultant mixture was diluted to a spray-coatable viscosity with a thinner of xylene: butyl acetate=1:1, thus obtaining an acrylic melamine resin paint composition.

(Acrylic Polyol/poly(blocked isocyanate) Compound)

EXAMPLE 8

Titanium oxide (Tipaque CR-95, produced by Ishihara Sangyo Kaisha, Ltd.) was added to the aforementioned acrylic polyol (as obtained in Example 1) so that the pigment concentration in the nonvolatile content would be 40 weight %, and the titanium oxide was well dispersed into the acrylic polyol with a sand mill, thus obtaining a dispersion (hereinafter referred to as liquid I). A multifunctional blocked isocyanate (Sumidur BL-3175, produced by Sumitomo-Bayer Urethane Co., Ltd.) was weighed out as liquid II in such an amount that the equivalent ratio of the isocyanate group to the hydroxyl group of the aforementioned acrylic polyol in the above dispersion (liquid I) would be 1:1. These liquids I and II were mixed together and then diluted to a spray-coatable viscosity with a thinner of xylene: butyl acetate=1:1, thus obtaining a two-liquid type urethane resin paint composition.

The paint compositions as obtained in Examples 7 and 8 were spray-coated onto zinc-phosphated steel plates of 0.8 mm in thickness so as to form dry films of 30 μm in thickness respectively, and then the resultant films were dried at 170° C. for 30 minutes, thus obtaining test plates. These test plates were evaluated by the coating appearance, the weather resistance, the processability, the pencil hardness, and the solvent resistance as property evaluations. The results of these evaluations are shown in Table 2.

COMPARATIVE EXAMPLE 3

A four-necked flask, as equipped with a stirrer, a thermometer, a reflux condenser, a dropping funnel, and a nitrogen gas-introducing tube, was charged with 62 parts of xylene and 50 parts of butyl acetate and then heated to 95° C. under a nitrogen gas flow. Next, a mixture, comprising 43 parts of 4-methylcyclohexylmethyl methacrylate, 47 parts of methyl methacrylate, 8 parts of butyl acrylate, 1 part of methacrylic acid, 1 part of 2-hydroxyethyl methacrylate, and 0.25 part of benzoyl peroxide, was dropwise added into the flask over a period of 2 hours, and then the flask was retained at the same temperature as the above for 4 hours, thus obtaining a resin liquid for acrylic lacquer having a nonvolatile content of 44.6 weight % and a Gardner viscosity of $Z_3$-$Z_4$ (25° C.). The number-average molecular weight of the resultant polymer was about 14,000.

Titanium oxide (Tipaque CR-95, produced by Ishihara Sangyo Kaisha, Ltd.) was added to the aforementioned acrylic polyol so that the pigment concentration in the nonvolatile content would be 40 weight %, and the titanium oxide was well dispersed into the acrylic polyol with a sand mill, thus obtaining a dispersion. This dispersion was diluted to a spray-coatable viscosity with a thinner of toluene: butyl acetate=1:1, thus obtaining a paint composition containing a lacquer resin paint composition as a vehicle component.

The paint compositions as obtained in Examples 1 to 8 and Comparative Examples 1 to 3 were spray-coated onto zinc-phosphated steel plates of 0.8 mm in thickness so as to form dry films of 30 μm in thickness respectively, and then the resultant films were dried at 80° C. for 2 hours, thus obtaining test plates. These test plates were evaluated by the coating appearance, the weather resistance, the processability, the pencil hardness, and the solvent resistance as property evaluations on the below-mentioned standard. The results of these evaluations are shown in Table 2.

(Coating Appearance)

The surface states of the test plates were observed by the eye to make evaluation as follows.

◯: good, Δ: normal, x: bad.

(Weather Resistance)

An accelerated weathering test of the test plates was carried out with a sunshine weatherometer (Model No. WEL-SUN-HCB, produced by Suga Testing Machine Co., Ltd.) in accordance with JIS K5400. After 3,000 hours, the surface states of the test plates were observed to make evaluation as follows.

⊚: excellent, ◯: good, Δ: normal, x: bad.

(Impact Resistance)

The evaluation was carried out by the Dupont type impact testing method. The conditions are that the evaluation was carried out by the height at which cracking or peeling of paint films was caused by a weight of 50 g having a diameter of 0.5 inch.

(Processability)

The measurement was carried out by the fracture distance method in accordance with the Erichsen evaluation method of JIS K5400 to make evaluation as follows.

⊚: not less than 8 mm, ◯: 6 to 8 mm, □: 4 to 6 mm, Δ: 2 to 4 mm, x: 0 to 2 mm.

(Solvent Resistance)

After the test plates had been rubbed 50 times with methyl ethyl ketone-wetted gauze under a load of 1 kg, the surface states of the test plates were observed to make evaluation as follows.

◯: good, Δ: normal, x: bad.

TABLE 2

|  | Example 1 | Example 2 | Example 3 | Example 4 | Example 5 | Example 6 | Example 7 | Example 8 | Comparative Example 1 | Comparative Example 2 | Comparative Example 3 |
|---|---|---|---|---|---|---|---|---|---|---|---|
| Coating appearance | ◯ | ◯ | ◯ | ◯ | ◯ | ◯ | ◯ | ◯ | ◯ | ◯ | ◯ |
| Weather resistance | ⊚ | ⊚ | ◯ | ⊚ | ⊚ | ⊚ | ◯ | ⊚ | Δ | Δ | Δ |
| Impact resistance | ◯ | ⊚ | ⊚ | ⊚ | ◯ | ⊚ | Δ | ◯ | ◯ | x | x |
| Processability | ◯ | ⊚ | ◯ | ⊚ | ◯ | ⊚ | Δ | ◯ | ◯ | Δ | Δ |
| Pencil hardness | 2H | 2H | 2H | H | 2H | H | 3H | 2H | 2H | 2H | 2H |

TABLE 2-continued

|  | Example 1 | Example 2 | Example 3 | Example 4 | Example 5 | Example 6 | Example 7 | Example 8 | Comparative Example 1 | Comparative Example 2 | Comparative Example 3 |
|---|---|---|---|---|---|---|---|---|---|---|---|
| Solvent resistance | ◯ | ◯ | ◯ | ◯ | ◯ | ◯ | ◯ | ◯ | ◯ | x | x |

As is understood from Table 2, the resin composition according to the present invention has excellent weather resistance and processability.

EXAMPLE 9

A separable flask, as equipped with a stirrer, a thermometer, a condenser, a dropper, and a nitrogen gas-introducing tube, was charged with 82 parts of deionized water and then heated to 75° C. under a nitrogen gas flow. Next, 10 weight % of a pre-emulsion mixture was added thereto wherein the pre-emulsion mixture had been prepared by adding 40 parts of 4M-CHM-MA, 20 parts of methyl methacrylate, 20 parts of 2-hydroxyethyl methacrylate, 19 parts of 2-ethylhexyl acrylate, and 1 part of acrylic acid to an aqueous solution comprising 1.5 parts of Nonypol 200 (polyoxyethylene nonyl phenyl ether, produced by Sanyo Kasei Co., Ltd.), 1.5 parts of Hitenol N-08 (ammonium polyoxyethylene nonyl phenyl ether sulfonate, produced by Dai-ichi Kogyo Seiyaku Co., Ltd.), and 34 parts of deionized water. Subsequently, 10 parts of a 3 weight % aqueous potassium persulfate solution was added into the flask, and then its internal temperature was raised to 80° C. over a period of 15 minutes. Thereafter, the remaining 90 weight % of the pre-emulsion mixture was dropwise added into the flask over a period of 3 hours, and then the flask was retained at the same temperature as the above for 1 hour. After the flask had been cooled, 0.7 part of a 25 weight % aqueous ammonia solution was added into the flask to carry out neutralization, thus obtaining an acrylic polyol emulsion resin composition having a nonvolatile content of 45.0 weight %, a pH value of 8.3, a viscosity of 350 mPa.s, and a volume-average particle diameter of 150 nm. The results are shown in Table 3.

EXAMPLES 10 TO 12 AND COMPARATIVE EXAMPLES 4 TO 6

Resin compositions of Examples 10 to 12 and Comparative Examples 4 to 6 were obtained in the same way as of Example 9 except that the polymerizable monomer components as used in Example 9 were changed to those which are shown in Table 3.

Furthermore, white paints were prepared from the above resin compositions of Examples 10 to 12 and Comparative Examples 4 to 6 in accordance with the following combination:

emulsion: 146.7 parts
75 weight % aqueous butyl cellosolve solution: 12.0 parts
deionized water: 64.6 parts
Demol EP (produced by Kao Corporation): 2.0 parts
titanium oxide (rutile type): 60.0 parts
NOPCO 8034 (produced by SAN NOPCO LIMITED): 0.3 part
Adekanol UH-420 (produced by Asahi Denka Co., Ltd.): 1.0 part
total: 286.6 parts Next, deionized water was little by little dropwise added to a self-emulsifying type polyisocyanate "WB40-80D" (produced by Asahi Kasei Co., Ltd.) under stirring to obtain a water dispersion having a solid content of 50 weight %. Immediately thereafter, 28 g of this dispersion was added to 100 g of each of the emulsion resin compositions of Examples 10 to 12 and Comparative Examples 4 to 6, and then stirring was sufficiently carried out to prepare paint compositions. However, as to Comparative Example 6, a noncrosslinking type paint composition was prepared without adding the above self-emulsifying type polyisocyanate "WB40-80D" thereto.

These paint compositions were evaluated by the weather resistance, the flexibility, and the solvent resistance as property evaluations on the below-mentioned standard. The results of these evaluations are shown in Table 3.

(Weather Resistance Test)

Each of the white paints as obtained above was coated onto a slate plate so as to form a dry film of about 80 μm in thickness, and then the resultant film was left alone at normal temperature for 14 days, thus obtaining a test plate.

An accelerated weathering test of this test plate was carried out with a sunshine weatherometer (Model No. WEL-SUN-HCB, produced by Suga Testing Machine Co., Ltd.). After 2,500 hours, the surface state of the test plate was observed by the eye to carry out eye evaluation on the following standard.

◎: None of hazing, blistering, and cracking is observed.
◯: A little hazing is observed, but neither blistering nor cracking is observed.
Δ: Hazing, blistering, and cracking are observed.
x: Hazing, blistering, and cracking are much observed.

(Flexibility Test: Evaluation of Flexibility of Formed Film)

This test was carried out in accordance with the JIS K5400 8.1 testing method for the resistance of a coating film.

Specimens were prepared by adding a 75 weight % aqueous butyl cellosolve solution to each paint composition so that the minimum film formation temperature (MFT) would be in the range of 0 to 10° C.

Each of the above specimens was coated onto an aluminum plate by using an applicator of 0.1 mm (corresponding to 4 mil), and then left alone for 10 minutes, and then dried in a hot-air drying oven of 80° C. for 5 minutes, thus obtaining a test plate. This test plate was aged at a test temperature in a temperature-controllable box along with a tester for not shorter than 2 hours, thus controlling the temperature. Then, the test was carried out at intervals of 5° C. under bending conditions where the diameter of the axle was 10 mm, thereby examining a temperature at which the coating film began cracking when the test plate was bent, and making evaluation based on a value of A in the following calculation equation:

(Temperature at which cracking occurred in the bending test)—(MFT)=A is calculated.

◎: $-15°$ C. $\geq$ A
◯: $-10°$ C. $\geq$ A $> -15°$ C.

Δ: −5° C.≧A>−10° C.
x: A>−5° C.

TABLE 3

|  | Example 9 | Example 10 | Example 11 | Example 12 | Comparative Example 4 | Comparative Example 5 | Comparative Example 6 |
|---|---|---|---|---|---|---|---|
| 4M-CHM-MA | 40 | 20 | 60 |  |  |  | 40 |
| 4M-CHMA |  |  | 5 | 20 |  |  |  |
| CHMA |  |  | 5 |  |  | 50 |  |
| MMA | 20 | 20 |  |  | 40 | 21 | 20 |
| St |  |  |  |  | 10 |  |  |
| BMA |  | 20 |  |  | 9 |  |  |
| BA |  |  |  |  | 12 |  |  |
| 2EHA | 18 | 19 | 8 |  | 28 | 28 | 18 |
| HEMA | 20 | 20 | 20 | 20 | 1 | 1 | 20 |
| AA | 1 | 1 | 1 | 1 |  |  | 1 |
| HALS | 1 |  | 1 | 1 |  |  | 1 |
| RUVA |  |  |  | 2 |  |  |  |
| Nonvolatile content (wt %) | 45.0 | 44.7 | 45.1 | 44.9 | 44.6 | 44.8 | 45.0 |
| Viscosity (mPa · s) | 210 | 150 | 140 | 180 | 160 | 220 | 210 |
| pH | 8.6 | 8.7 | 8.6 | 8.6 | 8.7 | 8.6 | 8.6 |
| MFT (° C.) | 22 | 21 | 15 | 15 | 18 | 21 | 22 |
| Volume-average particle diameter (nm) | 143 | 150 | 160 | 150 | 152 | 145 | 143 |
| Crosslinking agent | Used | Used | Used | Used | Used | Used | Not used |
| Weather resistance test | ⊚ | ○ | ⊚ | ⊚ | x | ⊚ | Δ |
| Flexibility test | ⊚ | ⊚ | ⊚ | ⊚ | ⊚ | Δ | ○ |
| Solvent resistance | ○ | ○ | ○ | ○ | ○ | ○ | x |

As is understood from Table 3, the resin composition according to the present invention has excellent weather resistance and processability.

(COOH-group-containing Polymer/oxazoline Polymer)

EXAMPLE 13

First, an aqueous polymer (A) was produced in the following way. A flask, as equipped with a thermometer, a nitrogen gas-introducing tube, a reflux condenser, a dropping funnel, and a stirrer, was used as a reactor. This reactor was charged with 782.4 parts of deionized water (as an aqueous medium) and 128 parts of a 15 weight % aqueous solution of a surfactant (ammonium polyoxyethylene nonyl phenyl ether sulfonate: Hitenol N-08, produced by Dai-ichi Kogyo Seiyaku Co., Ltd.). On the other hand, the dropping funnel was charged with a monomer composition (a) as prepared by mixing together 32 parts of acrylic acid, 320 parts of butyl acrylate, and 288 parts of 4M-CHM-MA as carboxyl-group-containing monomers.

Next, while being stirred under a nitrogen gas flow, the above aqueous solution was heated to 70° C. and then mixed with 64 parts of a 5 weight % aqueous potassium persulfate solution that was a polymerization initiator. Thereafter, under stirred conditions at 70±1° C. under a nitrogen gas flow, the above monomer composition (a) was dropwise added to the resultant aqueous solution over a period of 3 hours.

After the dropwise addition had been completed, while being stirred under a nitrogen gas flow, the resultant reaction solution was allowed to react at 70±1° C. for 2 hours and then further react by continuing the stirring at 80° C. for 1 hour, thus completing the polymerization reaction.

After the completion of the reaction, the reaction solution was cooled, and then the pH of this reaction solution was adjusted to 8.5 with a 28 weight % aqueous ammonia solution, thus obtaining an aqueous solution of an aqueous polymer (A) having a nonvolatile content (aqueous polymer (A)) of 39.8 weight %, a viscosity of 350 mPa.s (25° C.), and a volume-average particle diameter of 120 nm.

Next, an aqueous polymer (B) was produced in the following way. A reactor having the same structure as that of the above reactor was charged with 116 parts of deionized water (as an aqueous medium) and 4 parts of a polymerization initiator (2,2'-azobis(2-amidinopropane) dihydrochloride: V-50, produced by Wako Pure Chemical Industries, Ltd.). On the other hand, the dropping funnel was charged with a monomer composition (b) as prepared by mixing together 40 parts of 2-isopropenyl-2-oxazoline (as an oxazoline derivative) and 40 parts of methoxypolyethylene glycol acrylate (number-average degree of polymerization of ethylene glycol=9 mol: NK Ester AM-90G, produced by Shin-Nakamura Chemical Industrial Co., Ltd.).

Next, while being stirred under a nitrogen gas flow, the above aqueous solution was heated to 70° C. Thereafter, under stirred conditions at 70±1° C. under a nitrogen gas flow, the above monomer composition (b) was dropwise added to the resultant aqueous solution over a period of 1 hour.

After the dropwise addition had been completed, while being stirred under a nitrogen gas flow, the resultant reaction solution was allowed to react by retaining it constantly at 70±1° C. for 9 hours, thus completing the polymerization reaction.

After the completion of the reaction, the reaction solution was cooled, thus obtaining an aqueous solution of an aqueous polymer (B) having a nonvolatile content of 41.5 weight %, a pH value of 6.5, and a viscosity of 67 mPa.s (25° C.).

EXAMPLES 14 TO 16 AND COMPARATIVE EXAMPLES 7 TO 9

Aqueous polymers (A) of Examples 14 to 16 and Comparative Examples 7 to 9 were obtained by polymerization in the same way as the production of the aqueous polymer (A) of Example 13 except that the combinations were changed to those which are shown in Table 4. In addition, also as to polymer (B), polymer (B) paint compositions of Examples 14 to 16 and Comparative Examples 7 to 9 were prepared in the same way as of Example 13.

polyol emulsion/isocyanate crosslinking systems" except that the heat-curing was carried out at a curing temperature of 160° C. for 30 minutes. The resultant specimens were evaluated by the weather resistance and the flexibility in the above evaluation ways. The results thereof are shown in Table 4.

TABLE 4

|  | Example 13 | Example 14 | Example 15 | Example 16 | Comparative Example 7 | Comparative Example 8 | Comparative Example 9 |
|---|---|---|---|---|---|---|---|
| 4M-CHM-MA | 288 | 153 | 192 | 320 |  |  | 288 |
| 2,4M-CHM-MA |  |  | 192 |  |  |  |  |
| CHMA |  |  |  |  |  | 288 |  |
| MMA |  | 128 | 64 | 128 | 288 |  |  |
| BMA |  | 320 | 153 | 146 |  |  |  |
| BA | 320 |  |  |  | 320 | 320 | 320 |
| 2EHA |  |  |  |  |  |  |  |
| HEMA |  |  |  |  |  |  |  |
| AA | 32 | 32 | 32 | 32 | 32 | 32 | 32 |
| HALS |  | 7 | 7 | 7 |  |  |  |
| RUVA |  |  |  | 7 |  |  |  |
| Nonvolatile content (wt %) | 39.4 | 39.2 | 39.3 | 39.7 | 39.8 | 39.9 | 39.6 |
| Viscosity (mPa · s) | 230 | 250 | 130 | 220 | 580 | 310 | 350 |
| Volume-average particle diameter (nm) | 150 | 140 | 130 | 150 | 120 | 140 | 130 |
| Crosslinking agent | Used | Used | Used | Used | Used | Used | Not used |
| Weather resistance test | ⊚ | ○ | ⊚ | ⊚ | x | ⊚ | Δ |
| Flexibility test | ⊚ | ⊚ | ⊚ | ⊚ | ⊚ | Δ | ○ |
| Solvent resistance | ○ | ○ | ○ | ○ | ○ | ○ | x |

Furthermore, white paints were prepared for the above Examples 13 to 16 and Comparative Examples 7 to 9 in accordance with the following combination:

aqueous polymer (A): 146.7 parts 75 weight % aqueous butyl cellosolve solution: 12.0 parts deionized water: 64.6 parts Demol EP (produced by Kao Corporation): 2.0 parts titanium oxide (rutile type): 60.0 parts NOPCO 8034 (produced by SAN NOPCO LIMITED): 0.3 part Adekanol UH-420 (produced by Asahi Denka Co., Ltd.): 1.0 part total: 286.6 parts Next, 7.7 g of each of the aqueous polymers (B) (oxazoline resins) of Examples 13 to 16 and Comparative Examples 7 to 9 was added to 100 g of each of the above white paint compositions of Examples 13 to 16 and Comparative Examples 7 to 9, and then stirring was sufficiently carried out to prepare paint compositions. However, as to Comparative Example 9, a noncrosslinking type paint composition was prepared without adding the above oxazoline resin thereto.

These paint compositions were evaluated by the weather resistance, the flexibility, and the solvent resistance as property evaluations on the below-mentioned standard. The results of these evaluations are shown in Table 3.

Specimens were prepared from these paint compositions in the same way as of the aforementioned conditions for preparing the specimens of the aqueous two-liquid type urethane paint compositions of the aforementioned "acrylic polyol emulsion/isocyanate crosslinking systems" except that the heat-curing was carried out at a curing temperature of 160° C. for 30 minutes. The resultant specimens were evaluated by the weather resistance and the flexibility in the above evaluation ways. The results thereof are shown in Table 4.

(COOH-group-containing Polymer/epoxy Resin)

EXAMPLE 17

An aqueous polymer (A) of Example 17 was produced by the same combination and in the same way as the production of the aqueous polymer (A) of Example 13.

Next, a paint composition was obtained in the same way as of Example 13 except to replace the aqueous polymer (B) of Example 13 with Denacol EX-421 (produced by Nagase Chemicals, Ltd.) that is an aqueous epoxy resin. Then, the weather resistance, the flexibility, and the solvent resistance were evaluated in the same way as of Example 13. The results thereof are shown in Table 5.

(Oxazoline-group-containing Polymer/COOH-group-containing Resin)

EXAMPLE 18

An aqueous carboxyl-group-containing resin polymer (A) of Example 18 was produced by the same combination and in the same way as the production of the aqueous polymer (A) of Example 13.

Furthermore, an aqueous polymer (B) of Example 18 was produced in the following way. A reactor having the same structure as that of the above reactor was charged with 116 parts of deionized water (as an aqueous medium) and 4 parts of a polymerization initiator (2,2'-azobis(2-amidinopropane) dihydrochloride: V-50, produced by Wako Pure Chemical Industries, Ltd.). On the other hand, the dropping funnel was charged with a monomer composition (b) of Example 18 as prepared by mixing together 40 parts of 2-isopropenyl-2-oxazoline (as an oxazoline derivative), 20 parts of methoxypolyethylene glycol acrylate (number-average degree of polymerization of ethylene glycol=9 mol: NK Ester AM-90G, produced by Shin-Nakamura Chemical Industrial Co., Ltd.), and 20 parts of 4-methylcyclohexylmethyl methacrylate.

Next, while being stirred under a nitrogen gas flow, the above aqueous solution was heated to 70° C. Thereafter, under stirred conditions at 70±1° C. under a nitrogen gas flow, the above monomer composition (b) was dropwise added to the resultant aqueous solution over a period of 1 hour.

After the dropwise addition had been completed, while being stirred under a nitrogen gas flow, the resultant reaction solution was allowed to react by retaining it constantly at 70±1° C. for 9 hours, thus completing the polymerization reaction.

After the completion of the reaction, the reaction solution was cooled, thus obtaining an aqueous solution of an aqueous polymer (B) of Example 18 having a nonvolatile content of 41.4 weight %, a pH value of 6.5, and a viscosity of 320 mPa.s.

Then, the weather resistance, the flexibility, and the solvent resistance were evaluated in the same way as of Example 13. The results thereof are shown in Table 5.

TABLE 5

|  | Example 17 | Example 18 |
| --- | --- | --- |
| Crosslinking agent | Used | Used |
| Weather resistance test | ○ | ⊚ |
| Flexibility test | ⊚ | ⊚ |
| Solvent resistance | ○ | ○ |

(Epoxy-group-containing Resin/polyamine Compound)

EXAMPLE 19

(Process for Producing Epoxy-group-containing Resin)

A four-necked flask, as equipped with a stirrer, a thermometer, a reflux condenser, a dropping funnel, and a nitrogen gas-introducing tube, was charged with 62 parts of xylene and 50 parts of butyl acetate and then heated to 105° C. under a nitrogen gas flow. Next, a mixture, comprising 50 parts of 4-methylcyclohexylmethyl methacrylate, 22 parts of methyl methacrylate, 9 parts of butyl acrylate, 19 parts of glycidyl methacrylate, and 1.75 parts of ABN-E, was dropwise added into the flask over a period of 3 hours, and then the flask was retained at the same temperature as the above for 4 hours, thus obtaining an epoxy-group-containing acrylic resin liquid having a nonvolatile content of 44.2 weight % and a Gardner viscosity of S-T (25° C.). The number-average molecular weight of the resultant polymer was about 7,200.

Next, a paint composition of Example 19 was obtained by mixing together the resultant epoxy-group-containing acrylic resin liquid and a multifunctional polyamine (Jeffamine T-403, produced by Mitsui Texaco Chemical Co., Ltd.) in such a ratio that the equivalent ratio of the epoxy group to the carboxyl group would be 1:1, and then diluting the resultant mixture to a spray-coatable viscosity with a thinner of toluene butyl acetate=1:1.

The above paint composition was spray-coated onto zinc-phosphated steel plates of 0.8 mm in thickness so as to form dry films of 30 μm in thickness respectively, and then the resultant films were dried at 140° C. for 50 minutes, thus obtaining test plates. These test plates were evaluated by the coating appearance, the weather resistance, the processability, the pencil hardness, and the solvent resistance as property evaluations. The results of these evaluations are shown in Table 6. The evaluation standard was the same as that in Example 1 of the solvent type acrylic polyol/polyisocyanate.

(Epoxy-group-containing Resin/polycarboxylic Acid Compound)

EXAMPLE 20

A four-necked flask, as equipped with a stirrer, a thermometer, a reflux condenser, a dropping funnel, and a nitrogen gas-introducing tube, was charged with 62 parts of xylene and 50 parts of butyl acetate and then heated to 105° C. under a nitrogen gas flow. Next, a mixture, comprising 50 parts of 4-methylcyclohexylmethyl methacrylate, 23 parts of methyl methacrylate, 8 parts of butyl acrylate, 19 parts of glycidyl methacrylate, and 1.75 parts of ABN-E, was dropwise added into the flask over a period of 3 hours, and then the flask was retained at the same temperature as the above for 4 hours, thus obtaining an epoxy-group-containing acrylic resin liquid having a nonvolatile content of 44.2 weight % and a Gardner viscosity of S-T (25° C.). The number-average molecular weight of the resultant polymer was about 7,200.

In addition, a crosslinking agent was prepared in the following way. A four-necked flask, as equipped with a stirrer, a thermometer, a reflux condenser, a dropping funnel, and a nitrogen gas-introducing tube, was charged with 50 parts of butyl acetate and 50 parts of isopropanol and then heated to 90° C. under a nitrogen gas flow. Next, a mixture, comprising 20 parts of 4-methylcyclohexylmethyl methacrylate, 30 parts of methyl methacrylate, 20 parts of butyl acrylate, 30 parts of methacrylic acid, and 5 parts of 2,2'-azobisisobutyronitrile, was dropwise added into the flask over a period of 2 hours, and then the flask was retained at the same temperature as the above for 4 hours, thus obtaining a carboxyl-group-containing acrylic resin liquid having a nonvolatile content of 49.8 weight %, a number-average molecular weight of 6,000 and an acid value of 96 mgKOH/g.

Next, a paint composition of Example 20 was obtained by mixing together the resultant epoxy-group-containing acrylic resin liquid and the resultant carboxyl-group-containing acrylic resin liquid in such a ratio that the equivalent ratio of the epoxy group to the carboxyl group would be 1:1.

The above paint composition was spray-coated onto zinc-phosphated steel plates of 0.8 mm in thickness so as to form dry films of 30 μm in thickness respectively, and then the resultant films were dried at 80° C. for 90 minutes, thus obtaining test plates. These test plates were evaluated by the coating appearance, the weather resistance, the processability, the pencil hardness, and the solvent resistance as property evaluations. The results of these evaluations are shown in Table 6. The evaluation standard was the same as that in Example 1 of the solvent type acrylic polyol/polyisocyanate.

EXAMPLE 21

An epoxy-group-containing acrylic resin liquid having a nonvolatile content of 44.2 weight % and a Gardner viscosity of W-X (25° C.) was obtained by the same combination and in the same way as of Example 20 except that the butyl acrylate, as used to prepare the epoxy-group-containing acrylic resin liquid of Example 20, was replaced with 3-methacryloxypropyltriethoxysilane. The number-average molecular weight of the resultant polymer was about 8,200.

In addition, the subsequent preparations of the curing agent and the paint and the subsequent evaluations were carried out in the same way as of Example 20. The results of the evaluations are shown in Table 6.

(Isocyanate-group-containing Resin/polyol Compound)

EXAMPLE 22

(Process for Producing Isocyanate-group-containing Resin)

A four-necked flask, as equipped with a stirrer, a thermometer, a reflux condenser, a dropping funnel, and a nitrogen gas-introducing tube, was charged with 62 parts of xylene and 50 parts of butyl acetate and then heated to 100° C. under a nitrogen gas flow. Next, a mixture, comprising 50 parts of 4-methylcyclohexylmethyl methacrylate, 22 parts of methyl methacrylate, 18.5 parts of butyl acrylate, 0.5 part of methacrylic acid, 9 parts of 2-methacryloyloxyethyl isocyanate, and 2.5 parts of ABN-E, was dropwise added into the flask over a period of 3 hours, and then the flask was retained at the same temperature as the above for 2 hours, thus obtaining a resin liquid having a nonvolatile content of 44.3 weight % and a Gardner viscosity of R-S (25° C.). The number-average molecular weight of the resultant polymer was about 5,200.

Furthermore, a multifunctional polypropylene glycol (Adeka Polyether G-700, produced by Asahi Denka Kogyo Co., Ltd.) was weighed out in such an amount that the ratio of thereof to the aforementioned resin liquid would be 10 g: 100 g. These resin liquid and multifunctional polypropylene glycol were mixed together and then diluted to a spray-coatable viscosity with a thinner of toluene: butyl acetate= 1:1 (ratio by equivalent), thus obtaining a paint composition.

The above paint composition was spray-coated onto zinc-phosphated steel plates of 0.8 mm in thickness so as to form dry films of 30 μm in thickness respectively, and then the resultant films were dried at 80° C. for 90 minutes, thus obtaining test plates. These test plates were evaluated by the coating appearance, the weather resistance, the processability, the pencil hardness, and the solvent resistance as property evaluations. The results of these evaluations are shown in Table 6. The evaluation standard was the same as that in Example 1 of the solvent type acrylic polyol/polyisocyanate.

TABLE 6

|  | Example 19 | Example 20 | Example 21 | Example 22 |
|---|---|---|---|---|
| Coating appearance | ○ | ○ | ○ | ○ |
| Weather resistance | ○–◉ | ◉ | ◉ | ◉ |
| Impact resistance | ◉ | ◉ | ◉ | ◉ |
| Processability | ◉ | ◉ | ◉ | ◉ |
| Pencil hardness | F | F | H | F |
| Solvent resistance | ○ | ○ | ○ | ○ |

(Active-carbonyl-group-containing Resin/dihydrazide)

EXAMPLE 23

(Process for Producing Crosslinkable Aqueous Resin Dispersion)

A reactor, as equipped with a temperature controller, an anchor type stirrer, a reflux condenser, a feeder, a thermometer, and a nitrogen gas-introducing tube, was prepared, and the following reaction mixtures X and Y were prepared. In addition, the ratios of the components for producing the crosslinkable aqueous resin dispersion composition are shown in Table 7.

| (Reaction mixture X): | |
|---|---|
| water | 80 parts |
| 4M-CHM-MA | 63 parts |
| butyl acrylate (as component C) | 29 parts |
| diacetoneacrylamide (as component B) | 5 parts |
| acrylic acid (as component C) | 2 parts |
| acrylamide (as component C) | 1 part |
| sodium salt of sulfate ester of ethylene-oxide-20 mol-added nonylphenol (35 weight % aqueous solution) (as emulsifier component) | 6 parts |
| (Reaction mixture Y): | |
| water | 16 parts |
| sodium persulfate | 0.5 part |

Next, 20% of each of the above reaction mixtures X and Y was placed into the reactor, and the internal air of the reactor was replaced with nitrogen, and then the internal temperature of the reactor was raised to 90° C. Thereafter, the remainder of each of the reaction mixtures X and Y was continuously dropwise added into the reactor over a period of 90 minutes. After the completion of this dropwise addition, the reactor was retained at the same temperature as the above for 60 minutes to complete a copolymerization reaction. Thereby a fundamental aqueous resin dispersion was obtained from the above copolymer.

Thereafter, 2.5 parts of a 25 weight % aqueous ammonia solution and 17 parts of a 15 weight % aqueous adipic dihydrazide solution (as neutralizers) were added to and mixed with the above dispersion, and the resultant mixture was cooled to room temperature, thus obtaining a crosslinkable aqueous resin dispersion composition, which had a nonvolatile content of 46.3 weight % and a pH value of 8.1.

EXAMPLES 24 TO 25 AND COMPARATIVE EXAMPLES 10 TO 11

Each crosslinkable aqueous resin dispersion composition was obtained in the same way as of Example 23 except that the raw materials as used were changed to those which are shown in Table 7.

In addition, the abbreviations shown in Table 7 are as follows:

CHMA: cyclohexyl methacrylate
CHA: cyclohexyl acrylate
DAAM: diacetoneacrylamide
Acr: acrolein
St: styrene
MMA: methyl methacrylate
BA: butyl acrylate
EA: ethyl acrylate
2EHA: 2-ethylhexyl acrylate
AN: acrylonitrile
AA: acrylic acid
MAA: methacrylic acid
A. Amide: acrylamide
ADH: adipic dihydrazide The weather resistance and the flexibility were evaluated as evaluations of the properties of the crosslinkable aqueous resin dispersion compositions of Examples 23 to 25 and Comparative Examples 10 to 11. The results of these evaluations are shown in Table 8. The evaluation methods and standards were the same as those in Examples 1 and 9 of the solvent type acrylic polyol/polyisocyanate.

and the following other monomers: 30.0 parts of t-butyl methacrylate (t-BMA), 20.0 parts of styrene (St), 5.6 parts of 2-ethylhexyl acrylate (2EHA), and 1.0 part of 4-methacryloyloxy-1,2,2,6,6-pentamethylpiperidine

TABLE 7

|  | Example 23 | Example 24 | Example 25 | Comparative Example 10 | Comparative Example 11 |
|---|---|---|---|---|---|
| 4M-CHM-MA | 63 | 20 | 5 | 63 | 0 |
| DAAM | 5 | 6 | 5 | 5 | 5 |
| Acr | 0 | 0 | 0 | 0 | 0 |
| 4M-CHM-A | 0 | 0 | 64 | 0 | 0 |
| MMA | 0 | 40 | 0 | 0 | 71 |
| BA | 29 | 0 | 24 | 29 | 21 |
| EA | 0 | 0 | 0 | 0 | 0 |
| 2EHA | 0 | 31 | 0 | 0 | 0 |
| AN | 0 | 0 | 0 | 0 | 0 |
| AA | 2 | 1 | 2 | 2 | 1 |
| MAA | 0 | 1 | 0 | 0 | 1 |
| A. Amide | 1 | 1 | 0 | 1 | 1 |
| Chain transfer agent | — | — | — | — | — |
| Hydrazine derivative | ADH 2.5 | ADH 2.5 | ADH 2.5 | — | ADH 2.5 |
| 25 wt % aqueous ammonia solution | 2.5 | 2.8 | 1.6 | 2.5 | 1.6 |
| Amount of film-forming assistant as added (parts) | 8 | 6 | 10 | 8 | 8 |

TABLE 8

|  | Example 23 | Example 24 | Example 25 | Comparative Example 10 | Comparative Example 11 |
|---|---|---|---|---|---|
| Weather resistance test (gloss retention ratio %) | ⊚ | ○ | ⊚ | × | × |
| Flexibility test | ⊚ | ○ | ⊚ | ○ | ⊚ |

From Table 8, it would be found that the paints comprising the crosslinkable aqueous resin dispersion compositions of Examples 23 to 25 exhibit excellent weather resistance or flexibility. On the other hand, the paints comprising the crosslinkable aqueous resin dispersion compositions of Comparative Examples 10 to 11 were evaluated as "x" in weather resistance. In addition, as to Comparative Example 11, the flexibility was evaluated as "⊙", but the gloss retention ratio (after 2,500 hours) is inferior to those of others.

(Resin Compositions for Powdery Paints)
(Epoxy-group-containing Acrylic Polymer/carboxylic Acid)

EXAMPLE 26

A four-necked flask, as equipped with a thermometer, a gas-blowing tube, a dropping funnel, a reflux condenser, and a stirrer, was charged with 23.3 parts of xylene and 33.3 parts of n-butyl acetate as solvents. Thereafter, while being stirred under a nitrogen gas flow, these solvents were heated to a reflux temperature.

On the other hand, the above dropping funnel was charged with a mixture comprising a monomer composition (100 parts) (comprising 15.0 parts of 4-methylcyclohexylmethyl methacrylate (4M-CHM-MA), 28.4 parts of glycidyl methacrylate (GMA) as a glycidyl-group-containing monomer, (HALS)), 10.0 parts of xylene as a solvent, and 5.0 parts of 2,2'-azobis(2-methylbutyronitrile) as an initiator (initiator A).

Next, while the solution in the flask was stirred at a reflux temperature, the above mixture was dropwise added to this solution over a period of 3 hours. After this dropwise addition had been completed, the resultant reaction mixture was heated to 90° C. while being stirred under a nitrogen gas flow.

Thereafter, 0.2 part of the initiator A was added as an additional initiator every 60 minutes and thrice in total, and then the flask was retained for 2 hours, thus obtaining an acrylic resin solution as a reaction product.

The resultant acrylic resin solution was heated under reduced pressure to distill off the solvent components, thus obtaining an epoxy-group-containing acrylic polymer of Example 26 (acrylic polymer (26)).

The above acrylic polymer (26) had a number-average molecular weight (Mn) of 3,000, a weight-average molecular weight (Mw) of 5,000, a calculated Tg (° C.) of 62, and an epoxy group equivalent of 500.

Incidentally, the number-average molecular weight (Mn) and the weight-average molecular weight (Mw), as mentioned above, were measured by HLC-8120 Model gel permeation chromatography (using TDKgel G-5000HXL and TSKgel GMHXL-L in tandem; produced by TOSOH Corporation) (in terms of polystyrene). In this measurement, tetrahydrofuran was used as an eluent at a flow rate of 1 ml/min, and a differential refractometer was used as a detector.

Next, the resultant acrylic polymer (26) was mixed with dodecanedioic acid in a mixing ratio such that the equivalent of the carboxyl group would be 0.8 relative to 1 equivalent of epoxy group of the acrylic polymer (26).

Then, to the mixture resultant from this mixing step, Tinuvin 900 (produced by Ciba-Geigy AG) as an ultraviolet absorbent, Tinuvin 144 (produced by Ciba-Geigy AG) as a light stabilizer, Moda Flow POWDER III (produced by Monsanto Co., Ltd.) as a leveling agent, and benzoin as a defoamer were added in the ratios of 2 weight %, 1 weight %, 1 weight %, and 0.5 weight % respectively, and then they were premixed together. Thereafter, the resultant premixture was melt-kneaded at a rate of 20 g/minute in the range of 100 to 120° C. with a twin-screw extruder (S-1 KRC KNEADER, produced by Kurimoto, Ltd.) and then coarsely pulverized.

The coarsely pulverized product was further finely pulverized with Labo Jet Mill (produced by Nippon Pneumatic MFG. Co., Ltd.) and then classified, thus obtaining a resin composition (volume-average particle diameter=20 μm) for powdery paints of Example 26 (powdery paint (26)).

EXAMPLES 27 TO 31

Resin compositions for powdery paints of Examples 27 to 31 (powdery paints (27) to (31)) were obtained in the same way as of Example 26 except that the composition and amounts of monomers as used, the amount of the initiator as used, and the mixing ratio of dodecanedioic acid were changed to those which are shown in Table 9.

COMPARATIVE EXAMPLES 12 AND 13

Resin compositions for powdery paints of Comparative Examples 12 and 13 (comparative powdery paints (12) and (13)) were obtained in the same way as of Example 26 except that the composition and amounts of monomers as used, the amount of the initiator as used, and the mixing ratio of dodecanedioic acid were changed to those which are shown in Table 11.
(Hydroxyl-group-containing Acrylic Polymer/blocked Isocyanate Compound)

EXAMPLE 32

A hydroxyl-group-containing acrylic polymer of Example 32 (acrylic polymer (32)) was obtained in the same way as of Example 26 except that the composition and amounts of monomers as used and the amount of the initiator as used were changed to those which are shown in Table 9. Incidentally, in Example 32, the glycidyl methacrylate (GMA) which was used as a monomer in Example 26 was replaced with 2-hydroxyethyl methacrylate (HEMA) containing a hydroxyl group.

The above acrylic polymer (32) had a number-average molecular weight (Mn) of 3,000, a weight-average molecular weight (Mw) of 5,200, a calculated Tg (° C.) of 57, and a hydroxyl group value (solid content) of 80.

Next, a compound (B-NCO), as obtained by blocking an isocyanurate type of isophorone diisocyanate with ε-caprolactam, was mixed with the resultant acrylic polymer (32) in a mixing ratio such that the equivalent of the isocyanate group would be 1.0 relative to 1 equivalent of hydroxyl group of the acrylic polymer (32).

Then, the mixture resultant from this mixing step was subjected to the same procedure as of Example 26, thus obtaining a resin composition for powdery paints of Example 32 (powdery paint (32)).

EXAMPLES 33 TO 37

Resin compositions for powdery paints of Examples 33 to 37 (powdery paints (33) to (37)) were obtained in the same way as of Example 32 except that the composition and amounts of monomers as used, the amount of the initiator as used, and the mixing ratio of the B-NCO were changed to those which are shown in Table 10.

COMPARATIVE EXAMPLES 14 AND 15

Resin compositions for powdery paints of Comparative Examples 14 and 15 (comparative powdery paints (14) and (15)) were obtained in the same way as of Example 32 except that the composition and amounts of monomers as used, the amount of the initiator as used, and the mixing ratio of the B-NCO were changed to those which are shown in Table 11.

The powdery paints (26) to (37) and the comparative powdery paints (12) to (15), as obtained above, were evaluated by the blocking resistance in the following way and on the following standard. The results of this evaluation are shown in Table 12 or 13.
(Blocking Resistance)

The powdery paint was placed into a cylindrical container with a base area of about 20 cm² so that the height of the powdery paint would be 6 cm, and then left stationary at 30° C. for 1 week. Thereafter, the powdery paint was got out to observe its state by the eye to evaluate it on the following standard.

⊚: No lump is observed.

○: A few lumps are observed, but are easy to loosen.

Δ: Lumps are observed and are very difficult to loosen.

x: Much lumping impossible to loosen.

In addition, the powdery paints (26) to (37) and the comparative powdery paints (12) to (15) were electrostatically coated individually onto a white plate so as to form a dry film of about 70 μm in thickness wherein the white plate had been prepared by beforehand coating a white two-liquid type urethane resin enamel onto a zinc-phosphated steel plate. The resultant paint films were dried and baked at 160° C. for 20 minutes, thus obtaining test plates (test plates (26) to (37) and comparative test plates (12) to (15)) for the above powdery paints.

The above test plates were evaluated by the paint film properties such as paint film appearance, solvent resistance, water resistance, acid resistance, and weather resistance in the following ways and on the following standards. The results of these evaluations are shown in Table 12 or 13.
(Paint Film Appearance)

The surface states of the test plates were observed by the eye to make evaluation on the following standard.

⊚: excellent, ○: good, Δ: normal, x: bad.
(Solvent Resistance)

After the test plates had been rubbed 50 times with methyl ethyl ketone-wetted cloth, the surface states of the test plates were observed by the eye to make evaluation on the following standard.

⊚: excellent, ○: good, Δ: normal, x: bad.
(Water Resistance)

After the test plates had been immersed in warm water of 40° C. for 1 week, the surface states of the test plates were observed by the eye to make evaluation on the following standard.

⊚: excellent, ○: good, Δ: normal, x: bad.

(Acid Resistance)

An amount of 1 ml of a 40 weight % aqueous sulfuric acid solution was dripped onto the surfaces of the paint films on the test plates, and then the test plates were heated for 15 minutes on a hot plate of 80° C. and then washed with water. Thereafter, the surface states of the test plates were observed by the eye to make evaluation on the following standard.

⊚: excellent, ○: good, Δ: normal, x: bad.

(Weather Resistance)

An accelerated weathering test of the test plates was carried out with a sunshine weatherometer (Model "WEL-SUN-HCB", produced by Suga Testing Machine Co., Ltd.). After 2,500 hours, the surface states of the test plates were observed by the eye to make evaluation on the following standard.

⊚: excellent, ○: good, Δ: normal, x: bad.

TABLE 9

|  | Example 26 | Example 27 | Example 28 | Example 29 | Example 30 | Example 31 |
|---|---|---|---|---|---|---|
| 4M-CHM-MA | 15.0 | 25.0 | 35.0 | 35.0 | 35.0 | 45.0 |
| GMA | 28.4 | 28.4 | 28.4 | 28.4 | 28.4 | 28.4 |
| CHMA |  |  |  |  |  |  |
| MMA |  |  |  |  |  |  |
| t-BMA | 30.0 | 25.6 | 15.6 | 15.6 | 15.6 | 5.6 |
| St | 20.0 | 20.0 | 20.0 | 20.0 | 20.0 | 20.0 |
| 2EHA | 5.6 |  |  |  |  |  |
| HALS | 1.0 | 1.0 | 1.0 | 1.0 | 1.0 | 1.0 |
| Initiator A | 5.0 | 5.0 | 5.0 | 5.0 | 5.0 | 5.0 |
| Mixing ratio of dodecanedioic acid | 0.8 | 0.8 | 0.8 | 1.0 | 1.2 | 0.8 |
| Calculated Tg (° C.) | 62 | 67 | 60 | 60 | 60 | 51 |
| Epoxy group equivalent | 500 | 500 | 500 | 500 | 500 | 500 |
| Number-average molecular weight Mn | 3,000 | 2,900 | 2,900 | 2,900 | 2,900 | 2,700 |
| Weight-average molecular weight Mw | 5,000 | 5,100 | 5,000 | 5,000 | 5,000 | 4,800 |

TABLE 10

|  | Example 32 | Example 33 | Example 34 | Example 35 | Example 36 | Example 37 |
|---|---|---|---|---|---|---|
| 4M-CHM-MA | 20.0 | 30.0 | 45.0 | 45.0 | 45.0 | 60.0 |
| HEMA | 18.5 | 18.5 | 18.5 | 18.5 | 18.5 | 18.5 |
| CHMA |  |  |  |  |  |  |
| MMA |  |  |  |  |  |  |
| MAA | 0.8 | 0.8 | 0.8 | 0.8 | 0.8 | 0.8 |
| t-BMA | 30.0 | 30.0 | 30.0 | 30.0 | 30.0 | 20.7 |
| St | 20.0 | 10.0 |  |  |  |  |
| BA | 10.7 | 10.7 | 5.7 | 5.7 | 5.7 |  |
| Initiator A | 5.0 | 5.0 | 5.0 | 5.0 | 5.0 | 5.0 |
| Mixing ratio of B-NCO | 1.0 | 1.0 | 1.0 | 0.8 | 1.2 | 1.0 |
| Calculated Tg (° C.) | 57 | 50 | 51 | 51 | 51 | 52 |
| Hydroxyl group value (solid content) | 80 | 80 | 80 | 80 | 80 | 80 |
| Number-average molecular weight Mn | 3,000 | 3,000 | 2,900 | 2,900 | 2,900 | 2,800 |
| Weight-average molecular weight Mw | 5,200 | 5,100 | 5,000 | 5,000 | 5,000 | 4,900 |

TABLE 11

|  | Comparative Example 12 | Comparative Example 13 | Comparative Example 14 | Comparative Example 15 |
|---|---|---|---|---|
| 4M-CHM-MA |  |  |  |  |
| GMA | 28.4 | 28.4 |  |  |
| HEMA |  |  | 18.5 | 18.5 |
| CHMA | 45.0 |  | 45.0 |  |
| MMA |  | 45.0 |  | 45.0 |
| MAA |  |  | 0.8 | 0.8 |
| t-BMA |  |  | 20.0 | 16.0 |
| St | 16.0 | 16.0 |  |  |
| 2EHA | 9.6 | 9.6 |  |  |
| BA |  |  | 15.7 | 19.7 |
| HALS | 1.0 | 1.0 |  |  |
| Initiator A | 5.0 | 5.0 | 5.0 | 5.0 |
| Mixing ratio of dodecanedioic | 0.8 | 0.8 |  |  |

TABLE 11-continued

|  | Comparative Example 12 | Comparative Example 13 | Comparative Example 14 | Comparative Example 15 |
|---|---|---|---|---|
| acid |  |  |  |  |
| Mixing ratio of B-NCO |  |  | 1.0 | 1.0 |
| Calculated Tg (° C.) | 50 | 58 | 52 | 51 |

TABLE 12

|  | Example 26 | Example 27 | Example 28 | Example 29 | Example 30 | Example 31 | Comparative Example 12 | Comparative Example 13 |
|---|---|---|---|---|---|---|---|---|
| Blocking resistance | ⊚ | ⊚ | ⊚ | ⊚ | ○ | ○ | ○ | ⊚ |
| Paint film appearance | ⊚ | ⊚ | ⊚ | ⊚ | ○ | ⊚ | ⊚ | Δ |
| Solvent resistance | ⊚ | ⊚ | ⊚ | ⊚ | ⊚ | ⊚ | ⊚ | ○ |
| Water resistance | ⊚ | ⊚ | ⊚ | ⊚ | ⊚ | ⊚ | ⊚ | ⊚ |
| Acid resistance | ⊚ | ⊚ | ⊚ | ⊚ | ⊚ | ⊚ | ○ | x |
| Weather resistance | ⊚ | ⊚ | ⊚ | ⊚ | ⊚ | ⊚ | ○ | x |

TABLE 13

|  | Example 32 | Example 33 | Example 34 | Example 35 | Example 36 | Example 37 | Comparative Example 14 | Comparative Example 15 |
|---|---|---|---|---|---|---|---|---|
| Blocking resistance | ⊚ | ○ | ○ | ⊚ | ○ | ○ | ○ | ○ |
| Paint film appearance | ⊚ | ⊚ | ⊚ | ⊚ | ○ | ⊚ | ⊚ | Δ |
| Solvent resistance | ⊚ | ⊚ | ⊚ | ⊚ | ⊚ | ⊚ | ⊚ | ○ |
| Water resistance | ⊚ | ⊚ | ⊚ | ⊚ | ⊚ | ⊚ | ⊚ | ⊚ |
| Acid resistance | ⊚ | ⊚ | ⊚ | ⊚ | ⊚ | ⊚ | ⊚ | x |
| Weather resistance | ⊚ | ⊚ | ⊚ | ⊚ | ⊚ | ⊚ | ○ | Δ |

TABLE 11-continued

|  | Comparative Example 12 | Comparative Example 13 | Comparative Example 14 | Comparative Example 15 |
|---|---|---|---|---|
| Epoxy group equivalent | 500 | 500 |  |  |
| Hydroxyl group value (solid content) |  |  | 80 | 80 |
| Number-average molecular weight Mn | 2,600 | 3,200 | 2,900 | 3,100 |
| Weight-average molecular weight Mw | 4,800 | 5,500 | 5,100 | 5,300 |

Incidentally, the abbreviations in Tables are as follows:

4M-CHM-MA: 4-methylcyclohexylmethyl methacrylate
GMA: glycidyl methacrylate
HEMA: 2-hydroxyethyl methacrylate
CHMA: cyclohexyl methacrylate
MMA: methyl methacrylate
MAA: methacrylic acid
t-BMA: t-butyl methacrylate
St: styrene
BA: n-butyl acrylate
2EHA: 2-ethylhexyl acrylate
HALS: 4-methacryloyloxy-1,2,2,6,6-pentamethylpiperidine Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A (meth)acrylate ester-based resin composition, which comprises a (meth)acrylate ester-based polymer (I) and a crosslinking agent, wherein the (meth)acrylate ester-based polymer is obtained by a process including the step of polymerizing a monomer component including a polymerizable unsaturated monomer (a) as an essential component and has a reactive group wherein the polymerizable unsaturated monomer (a) is an alkylcyclohexylalkyl ester of (meth)acrylic acid, and wherein the crosslinking agent has at least two functional groups that are reactable with the reactive group.

2. A (meth)acrylate ester-based resin composition according to claim 1, wherein the alkylcyclohexylalkyl ester of (meth)acrylic acid is denoted by the following general formula (1):

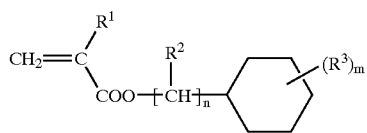 (1)

wherein:

R¹ is a hydrogen atom or methyl group;

R² is a hydrogen atom or organic residue;

R³ is an organic residue on the cyclohexyl group;

m is an integer of 1 or 2; and n is an integer of 1 to 4.

3. A (meth)acrylate ester-based resin composition according to claim 1, wherein the monomer component includes the alkylcyclohexylalkyl ester of (meth)acrylic acid in a ratio of 5–95 weight % to the monomer component.

4. A (meth)acrylate ester-based resin composition according to claim 1, which comprises the (meth)acrylate ester-based polymer in a ratio of 5–90 weight % to the (meth)acrylate ester-based resin composition.

5. A (meth)acrylate ester-based resin composition according to claim 1, wherein the (meth)acrylate ester-based polymer has a number-average molecular weight of 1,000 to 10,000,000.

6. A (meth)acrylate ester-based resin composition according to claim 1, which further comprises at least one member selected from the group consisting of pigments and aggregates.

7. A (meth)acrylate ester-based resin composition according to claim 1, which is a powdery paint.

* * * * *